United States Patent
Haga et al.

(10) Patent No.: US 9,904,279 B2
(45) Date of Patent: Feb. 27, 2018

(54) NUMERICAL CONTROL DEVICE PROVIDED WITH PROGRAMMED MACHINING RESTART FUNCTION

(71) Applicant: FANUC Corporation, Minamitsuru-gun, Yamanashi (JP)

(72) Inventors: Makoto Haga, Minamitsuru-gun (JP); Yousuke Koyanaka, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 274 days.

(21) Appl. No.: 14/717,310

(22) Filed: May 20, 2015

(65) Prior Publication Data

US 2015/0338845 A1    Nov. 26, 2015

(30) Foreign Application Priority Data

May 23, 2014  (JP) .................................. 2014-107416

(51) Int. Cl.
  *G06F 19/00*    (2011.01)
  *G05B 19/414*   (2006.01)
  (Continued)

(52) U.S. Cl.
  CPC ....... *G05B 19/4147* (2013.01); *G05B 19/042* (2013.01); *G05B 19/4067* (2013.01);
  (Continued)

(58) Field of Classification Search
  CPC ............ G05B 19/4067; G05B 19/4147; G05B 19/042
  (Continued)

(56) References Cited

U.S. PATENT DOCUMENTS

2005/0100378 A1*  5/2005  Kimura ................. G06F 3/1222
                                                       400/76
2006/0058906 A1*  3/2006  Ohashi ............... G05B 19/4069
                                                       700/182
(Continued)

FOREIGN PATENT DOCUMENTS

CN        101174144 A     5/2008
CN         1845026 A     10/2008
(Continued)

OTHER PUBLICATIONS

Hosokawa et al., Numerical Controller With Machining Restart Function, JP 2009223615 A, Oct. 1, 2009 (English translation 12 pages).*

(Continued)

*Primary Examiner* — Mohammad Ali
*Assistant Examiner* — Sheela S Rao
(74) *Attorney, Agent, or Firm* — Drinker Biddle & Reath LLP

(57) ABSTRACT

A numerical control device including a programmed machining restart function includes a first display unit for displaying, as a list, specific codes indicating limit points of machining steps of a machining program, a specification unit for specifying, among the specific codes displayed as a list by the first display unit, a specific code that is selected, and a program restart unit for executing, by using a location in a memory of the specific code that is specified by the specification unit, a restart operation of the machining program from a machining step including the specific code that is specified.

8 Claims, 18 Drawing Sheets

(51) Int. Cl.
*G05B 19/4067* (2006.01)
*G05B 19/042* (2006.01)

(52) U.S. Cl.
CPC .............. *G05B 2219/24199* (2013.01); *G05B 2219/33311* (2013.01); *G05B 2219/36133* (2013.01)

(58) Field of Classification Search
USPC ........................................................ 700/180
See application file for complete search history.

(56) References Cited

U.S. PATENT DOCUMENTS

| | | | |
|---|---|---|---|
| 2006/0229761 A1 | 10/2006 | Kita et al. | |
| 2009/0055016 A1 | 2/2009 | Fujibayashi et al. | |
| 2011/0190915 A1* | 8/2011 | Fujishima | G05B 19/4067 700/97 |
| 2013/0124184 A1 | 5/2013 | Sakaguchi et al. | |
| 2013/0338809 A1* | 12/2013 | Kume | G05B 19/4155 700/97 |

FOREIGN PATENT DOCUMENTS

| | | |
|---|---|---|
| CN | 102804087 A | 11/2012 |
| EP | 2104013 A2 | 9/2009 |
| JP | S55-37250 A | 3/1980 |
| JP | S62-32503 A | 2/1987 |
| JP | S63-265305 A | 11/1988 |
| JP | H01-300303 A | 12/1989 |
| JP | H04-360204 A | 12/1992 |
| JP | H05-158517 A | 6/1993 |
| JP | H09-134211 A | 5/1997 |
| JP | H09-528811 A | 10/1997 |
| JP | H09-311706 A | 12/1997 |
| JP | H10-143229 A | 5/1998 |
| JP | 2004-306073 A | 11/2004 |
| JP | 2006-085486 A | 3/2006 |
| JP | 2007-026323 A | 2/2007 |
| JP | 2009-053801 A | 3/2009 |
| JP | 2009-223615 A | 10/2009 |
| JP | 2013-071203 A | 4/2013 |
| JP | 2014-016982 A | 1/2014 |

OTHER PUBLICATIONS

Notification of Reasons for Refusal dated Mar. 1, 2016 in Japanese Patent Application No. 2014-107416 (5 pages) with an English Translation (5 pages).
The Notification of First Office Action dated Mar. 29, 2017 in Chinese Patent Application No. 2015102707539 (5 pages) with an English translation (7 pages).
Notification of Reasons for Refusal dated Oct. 13, 2015 in corresponding Japanese Patent Application No. 2014-107416 (4 pages) with an English Translation (4 pages).

* cited by examiner

| | |
|---|---|
| 102340H | N1200G01X100Y100 |
| 102350H | ;N120X110Y120;N |
| 102360H | 1202X130Y130;N12 |
| 102370H | 03G41X140Y150D01 |
| 102380H | ;N1204X160Y160;N |
| 102390H | 1205X170Y165;N12 |
| 1023A0H | 06X180Y140;N1207 |
| 1023B0H | X185Y135;N1208X1 |

FIG. 11

NUMERICAL CONTROL DEVICE PROVIDED WITH PROGRAMMED MACHINING RESTART FUNCTION

RELATED APPLICATION DATA

This application claims priority under 35 U.S.C. § 119 and/or § 365 to Japanese Application No. 2014-107416 filed May 23, 2014, the entire contents is incorporated herein by reference.

BACKGROUND OF THE INVENTION

1. Field of the Invention

The present invention relates to a numerical control device, and more particularly, to a numerical control device capable of restarting on a per machining step basis.

2. Description of the Related Art

A numerical control device for controlling a machine tool performs numerical control processing based on a machining program, and controls the machine tool based on the processing result of the numerical control processing to machine a workpiece.

As conventional techniques for restarting a program from an interrupted block or any program block which was already executed at a time when machining was interrupted during machining of a workpiece using the numerical control device, there are the following techniques.

Japanese Patent Laid-Open No. 63-265305 discloses, with respect to a program restart method of a numerical control device, a technique of determining, in the case where machining is interrupted during machining and is then to be restarted, the machining restart position by using a reverse function of returning a tool along the path it has been moving and restarting machining.

Japanese Patent Laid-Open No. 2009-053801 discloses, with respect to a numerical control device provided with a program restart function, a technique of restarting a program by distinguishing a non-cutting block at which a workpiece is not scratched even when the program is restarted and by acquiring program restart block data.

Japanese Patent Laid-Open No. 2009-223615 discloses, with respect to a numerical control device provided with a machining restart function, a technique of analyzing a program block performing machining during machining by a machining program, displaying, as a list, on a display unit, a plurality of pieces of program restart block data in the sequence of execution by using the analyzed program block, and selecting program restart block data from the screen displaying the list to thereby restart the program.

Japanese Patent Laid-Open No. 10-143229 discloses, with respect to a machining program of a machine tool control device including a plurality of steps, a technique of distinguishing, at the time of start of execution of the machining program, the step program to which the state of a machine tool corresponds, and starting the program from a step specified in advance based on a condition specified in advance.

Japanese Patent Laid-Open No. 05-158517 discloses, with respect to a numerical control device for reading and executing a machining program, a technique of recognizing a limit point of a step by adding identification information to each machining step configuring the machining program, separately from machining execution, and displaying and selecting identification information to thereby skip the steps preceding a selected step and restart the machining step.

Japanese Patent Laid-Open No. 09-258811 discloses, with respect to a numerical control device for controlling operation of a machine tool according to a machining program including a plurality of sequential single task programs, a technique of storing and recognizing the machining part of each step so that when an abnormality is detected when an operator is not around, if the machining part where the abnormality is detected is a registered abnormality-present machining part, the step may be automatically skipped without the machine being stopped.

With any of the techniques disclosed in Japanese Patent Laid-Open No. 63-265305, Japanese Patent Laid-Open No. 2009-053801, and Japanese Patent Laid-Open No. 2009-223615, a program is analyzed during execution of machining according to a machining program of a numerical control device. Thus, any portion may be selected from the block which has been performed until interruption of the machining, and restart from the portion may be performed. However, since analysis of the program is performed during execution of machining, restart from a portion where machining is not performed cannot be performed.

Accordingly, it is difficult to satisfy all of the demands of the following cases:

(1) A case where restart is performed from a machining step which is not related to the reason of an interruption and which is not yet performed, because preparation of recovery of the interrupted portion takes time;

(2) A case where machining steps that cannot be performed due to the reason of an interruption are intermittently present, and it is desired to perform other machining steps only;

(3) A case where a restart portion is desired to be reliably and easily selected regardless of the ability of the operator;

(4) A case where, when, after restarting is performed, it becomes ready to recover an interrupted portion during running of a program, it is desired to change the sequence of steps including a machining step not yet performed so as to recover the interrupted portion and to sequentially perform the interrupted portion after the current step being performed is ended.

With the technique disclosed in Japanese Patent Laid-Open No. 10-143229, a machining program including a plurality of step programs may be started from a step specified in advance based on a condition specified in advance, but restarting of the program may be performed only from a step satisfying the condition specified in advance, and thus, depending on the reason of an interruption, the program may have to be rewritten, and the operator's effort and ability may be required.

With the technique disclosed in Japanese Patent Laid-Open No. 05-158517, steps prior to a selected step may be skipped by recognizing a limit point of a step by adding identification information to each machining step and by displaying and selecting the identification information. However, since the identification information is added to each machining step, the identification information is not added to a step where the machining step is not ended, and it is not possible to skip a step after the selected step. Accordingly, application to a case where the steps to be skipped are intermittently present is not possible.

With the technique disclosed in Japanese Patent Laid-Open No. 09-258811, the machining portion of each step has to be stored in advance for each workpiece to be machined, and an advance preparation for each workpiece becomes necessary, and the ability of the operator may be required.

Accordingly, in view of these problems, the present invention has its aim to provide a numerical control device allowing easy restarting of an operation from a machining step not yet performed, regardless of the ability of an operator, after machining by a machining program of the numerical control device is interrupted.

A numerical control device, including a programmed machining restart function, according to the present invention, controls a machine tool and machines a workpiece by analyzing and executing a machining program on a per block basis, the numerical control device including a setting unit for setting in advance, for the machining program including a plurality of machining steps, specific codes indicating limit points of the machining steps, an analysis/detection unit for analyzing the machining program, and detecting the specific code at an arbitrary timing, a data acquisition/saving unit for acquiring and saving a location in a memory where a block of the specific code detected by the analysis/detection unit is stored, a first display unit for displaying the specific codes, as a list, by using a plurality of locations in the memory that are acquired and saved by the data acquisition/saving unit, a specification unit for specifying, among the specific codes displayed as a list by the first display unit, a specific code selected by an input from outside, and a program restart unit for executing, by using a location in the memory of the specific code that is specified by the specification unit, a restart operation of the machining program from a machining step including the specific code that is specified.

An analysis of detecting only a specific code, as a limit point of a step, specified by a parameter or the like (for example, an arbitrary code specified by a user such as "$$" or a tool change command such as M6) at an arbitrary timing such as at the time of start of execution of the machining program, during execution of the machining program, or during registration of the machining program is performed, and locations in a memory where all the specific codes detected and their blocks are stored are acquired and saved. Also, by allowing selection by a cursor or the like of saved data by displaying saved data as a list, and allowing restart of the program from a specific code block by using the location in the memory of the selected specific code, the program may be easily restarted from a machining step not yet executed.

There may also be provided second display unit for displaying, by using the location in the memory of the specific code specified by the specification unit among the specific codes displayed as a list by the first display unit, a block of the specific code and a predetermined number of blocks to be subsequently executed according to a program counter.

By displaying the block of a selected specific code and a predetermined number of blocks to be subsequently executed according to a program counter, the machining step to which the selected specific code corresponds may be recognized, and an operator is enabled to easily understand the contents of the specific code.

The arbitrary timing may be configured to be selected from among immediately before start of execution of the machining program, during execution of the machining program, during registration of the machining program, and a timing specified by an external input appliance.

A tool change command that is executed in each machining step may be taken as the specific code.

By taking a tool change command as the specific code, setting and embedding of a tool change command as a separate parameter become unnecessary, and the work may be performed more easily.

There may also be provided a first input setting specification unit for specifying a set machining sequence of the machining steps including the specific codes displayed by the first display unit as a list.

There may also be provided a machining step sequence specification/execution unit for causing the machining program to be executed according to the machining sequence of the machining steps specified by the first input setting specification unit, by using locations in the memory that are acquired and saved by the data acquisition/saving unit.

By including the specification unit for specifying, for specific codes that are displayed as a list by the first display unit, the machining sequence that is input and set, the machining sequence of machining steps to which respective specific codes correspond may be changed without editing the machining program itself. Accordingly, for example, in the case where there is a machining step that cannot be executed due to the reason of an interruption, the machining step that cannot be executed may be skipped, and subsequent machining steps that are not yet executed may be executed.

There may also be provided a second input setting specification unit for specifying a pause designation for the machining program that is set to a time of end of a machining step among the machining steps including the specific codes that are displayed by the first display unit as a list, a machining step end detection unit for detecting the end of the machining step by using the location in the memory that is acquired and saved by the data acquisition/saving unit, and a pause execution unit for executing pause of the machining program at the time of end of the machining step specified by the second input setting specification unit.

By providing the specification unit for specifying, in a specific code list display, an input machining step which is desired to be paused, pause may be executed after execution of the machining step which has been input and set.

Moreover, by enabling changing of the machining sequence and of input setting of pause also during program operation, when it becomes ready to recover an interrupted portion during program operation, recovery of the interrupted portion may be performed after the current machining step is ended, and also, the step sequence including machining steps not yet executed may be changed to sequentially execute the interrupted step.

With the structures described above, the present invention is able to provide a numerical control device which, after machining according to a machining program is interrupted, allows restarting of the operation from a machining step not yet executed with ease regardless of the ability of the operator.

BRIEF DESCRIPTION OF THE DRAWINGS

The above-described and other objects and features of the present invention will be made clear from the description of the embodiments given below with reference to the appended drawings. Of these drawings:

FIG. 11 is a diagram showing an example of a machining program according to a third embodiment;

DETAILED DESCRIPTION OF THE PREFERRED EMBODIMENTS

First, the location in a memory where the block of a specific code is stored will be described.

Generally, when a machining program is stored in a memory, the location in the memory is managed based on pointer information. Hereinafter, in the present specification, the pointer information will be taken as the "location in the memory", and will be referred to as a "program pointer".

For example, with respect to a certain machining program, the program pointer may be managed based on information as to the position of the byte from the beginning of the memory storing the program.

By acquiring the program pointer in advance for program restart block data, and displaying a list of blocks pointed to by program pointers at the time of displaying programs, a program pointer allowing restarting may be displayed. Furthermore, if a block pointed to by a program pointer and a predetermined number of blocks to be subsequently executed according to a program counter are simultaneously displayed, the contents of the program counter regarding restart may be displayed to a certain degree.

Figures 1, 2:
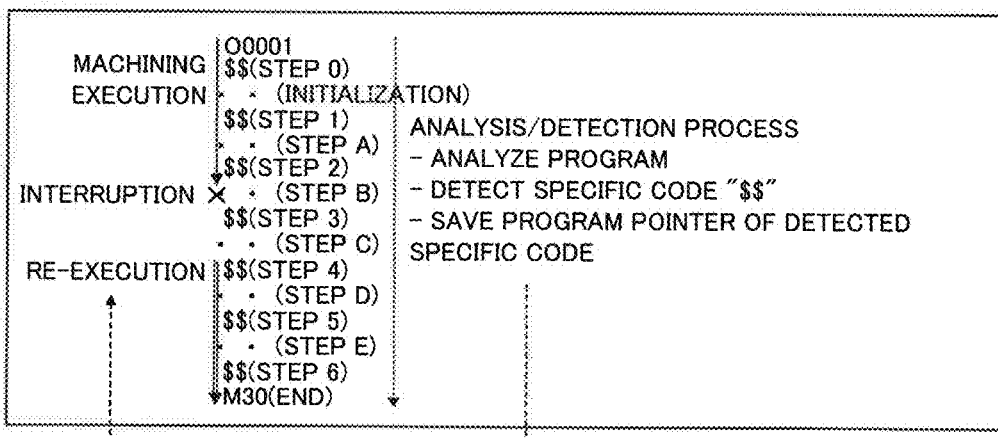
FIG. 1 is a diagram, according to an embodiment of the present invention, showing a storage location in a memory and example data stored at the location.
FIG. 2 is a diagram, according to a first embodiment, showing an example of a machining program.

FIG. 1 shows the storage location in a memory, and data stored at the location. In FIG. 1, to facilitate understanding, expression is based on characters stored in the memory, and the characters are divided into sets of 16 characters so that the location may be easily grasped. (Normally, one character of the alphabets or numbers is information of one byte, and thus, for example, data "1" is registered in the memory by the expression "31".)

In the case of registration in the memory as shown in FIG. 1, if the program pointer that is acquired/saved is "10236DH", it is assumed that a block "N1203G41X140Y150D01;" is saved.

First Embodiment

In a machining program including a plurality of machining steps, a specific code indicating the limit point of a machining step is set and embedded using a parameter or the like. This enables recognition of the limit point of each machining step. For example, in the case where "$$" is set as the specific code, two continuous "$" are recognized as the limit point of a step.

Also, regarding the specific code indicating the limit point of a machining step, an existing command may be used as the specific code indicating the limit point of a machining step, instead of separately setting a parameter or the like. For example, generally, a tool is changed at between machining steps, and thus a set of programs sandwiched by a tool change command such as M6T**** may be defined as one machining step, and the tool change command may be used as the specific code.

FIG. 2 shows an example of the machining program. FIG. 2(a) shows the contents of the machining program, and the top row shows the name of a program "O0001". Then, in the sequence of execution of machining, there are an initialization step as STEP 0, a step A as STEP 1, a step B as STEP 2, . . . , and lastly, an end step of STEP 6. At the beginning of each step, "$$" as the specific code for indicating the limit point of the step is added. With such a machining program, the machining program is analyzed at an arbitrary timing, and the specific codes are detected, and program pointers of specific codes are saved in the order of detection. Recognition of the limit point of each step is thereby enabled.

By using the saved program pointer ("sp_code_inf[PNT]" in the flow chart described later), a specific code list such as the list in FIG. 2(b) may be displayed. Additionally, in the present embodiment, display of the specific code list is in the order of detection of program pointers, but display based on other than the order of detection is also possible.

In the list in FIG. 2(b), items including the detection number (No.), the machining program name (PROG.), specific code block information (INFO.), and the position of a specific code in the machining program (BLOCK NO.) are displayed. Each of these is data can be acquired based on a saved program pointer. Additionally, with respect to the specific code block information (INFO.), information about a step or the like may be displayed by several letters of a comment or a command written for the same block as the specific code (in the list in FIG. 2(b), the comment following "$$" is displayed as the information, but in the case where the tool change command is taken as the specific code, the tool number (T code) or the like is used).

Moreover, it is also possible to allow selection of a specific code in the list in FIG. 2(b) by a cursor, and to display several blocks following the specific code by using the program pointers and the movement of the cursor. FIG. 2(b) shows a state where the specific code block information (INFO.) "STEP 4" of detection number (No.) 005 is selected, and several blocks to be executed according to the program counter following the specific code of STEP 4 are displayed on the right as (PROGRAM). Additionally, in the present embodiment, several blocks to be subsequently executed according to the program counter following the specific code of STEP 4 are displayed on the right as (PROGRAM), but display does not necessarily have to be performed.

Furthermore, by using the program pointer, the machining program may be restarted from the specific code block selected by the cursor. As shown in FIG. 2(a), in the present embodiment, machining is performed from STEP 0, and is interrupted in the step B "STEP 2", but re-execution from STEP 4 is performed by the selection of STEP 4.

Figure 3:
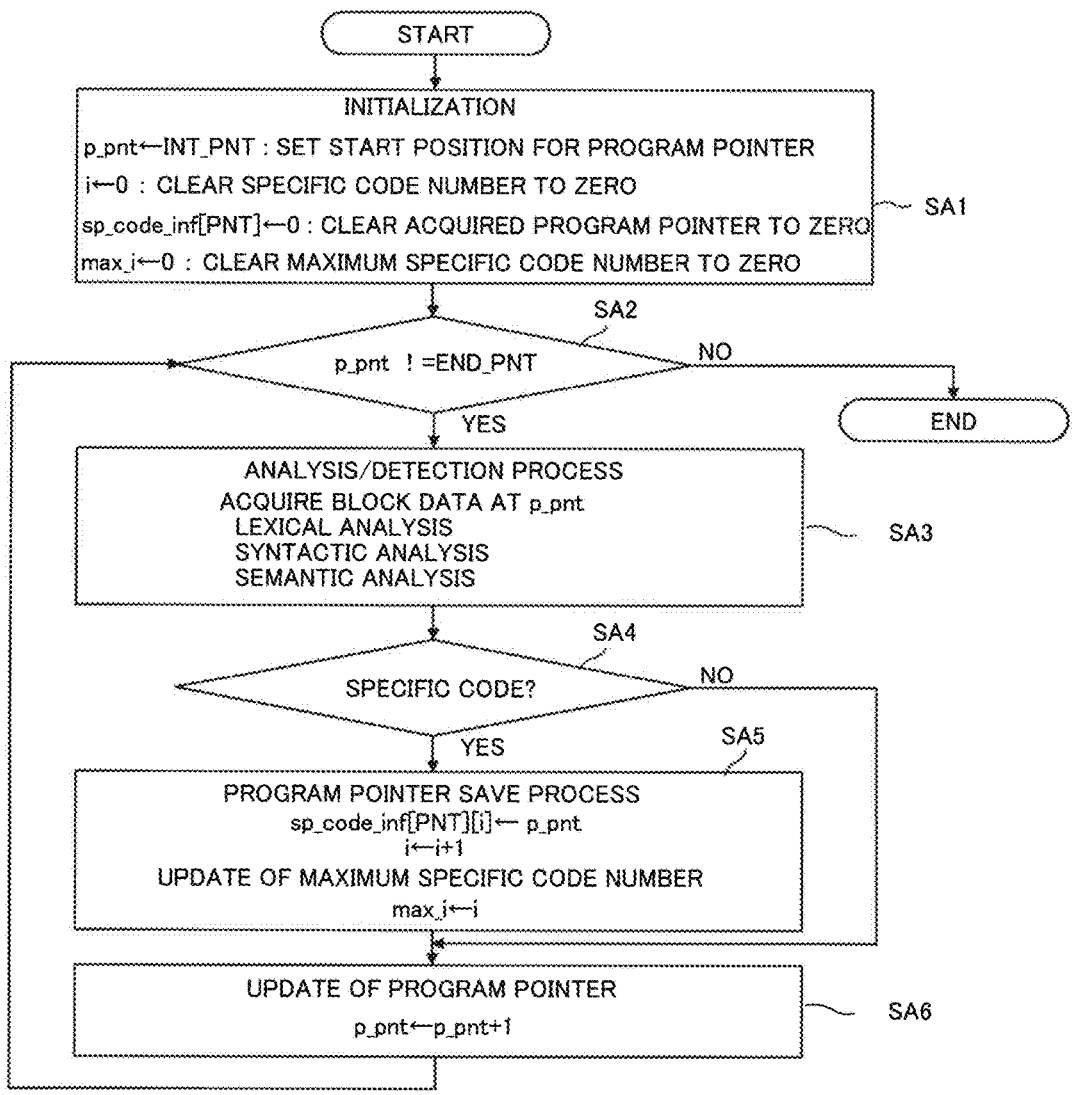
FIG. 3 is a flow chart, according to the first embodiment, showing operations of an analysis/detection unit and a data acquisition/saving unit.

Next, an operation of the present embodiment will be described with reference to the flow charts in FIGS. 3 and 4. FIG. 3 is a flow chart showing operations of analysis/detection unit and data acquisition/saving unit. In the following, each step will be described.

(Step SA1) An initialization operation is performed. A start position is set in a program pointer, and each of a specific code number, an acquired program pointer, and a maximum specific code number is cleared to zero.

(Step SA2) Whether the program pointer is other than the end of the program (END_PNT) is determined. In the case where it is other than the end of the program (YES), the process proceeds to step SA3, and in the case where it is the end of the program (NO), the process is ended.

(Step SA3) An analysis/detection process is performed. Block data is acquired at the program pointer, and lexical analysis (a process of sorting into alphabets and numbers), syntactic analysis (a process of determining a set of alphabets and numbers indicated by a command), and semantic analysis (a process of determining a function based on alphabets and numbers indicated by a command) are performed.

(Step SA4) Whether the analyzed block data corresponds to the specific code is determined. If it corresponds to the specific code (YES), the process proceeds to step SA5, and if there is no correspondence (NO), the process proceeds to step SA6.

(Step SA5) A process of saving the program pointer at the portion which is the specific code as sp_code_inf[PNT], and a process of updating the maximum specific code number by saving i in max_i are performed.

(Step SA6) The program pointer is updated by addition of one to p_pnt, and the process is returned to step SA2.

Figure 4A:
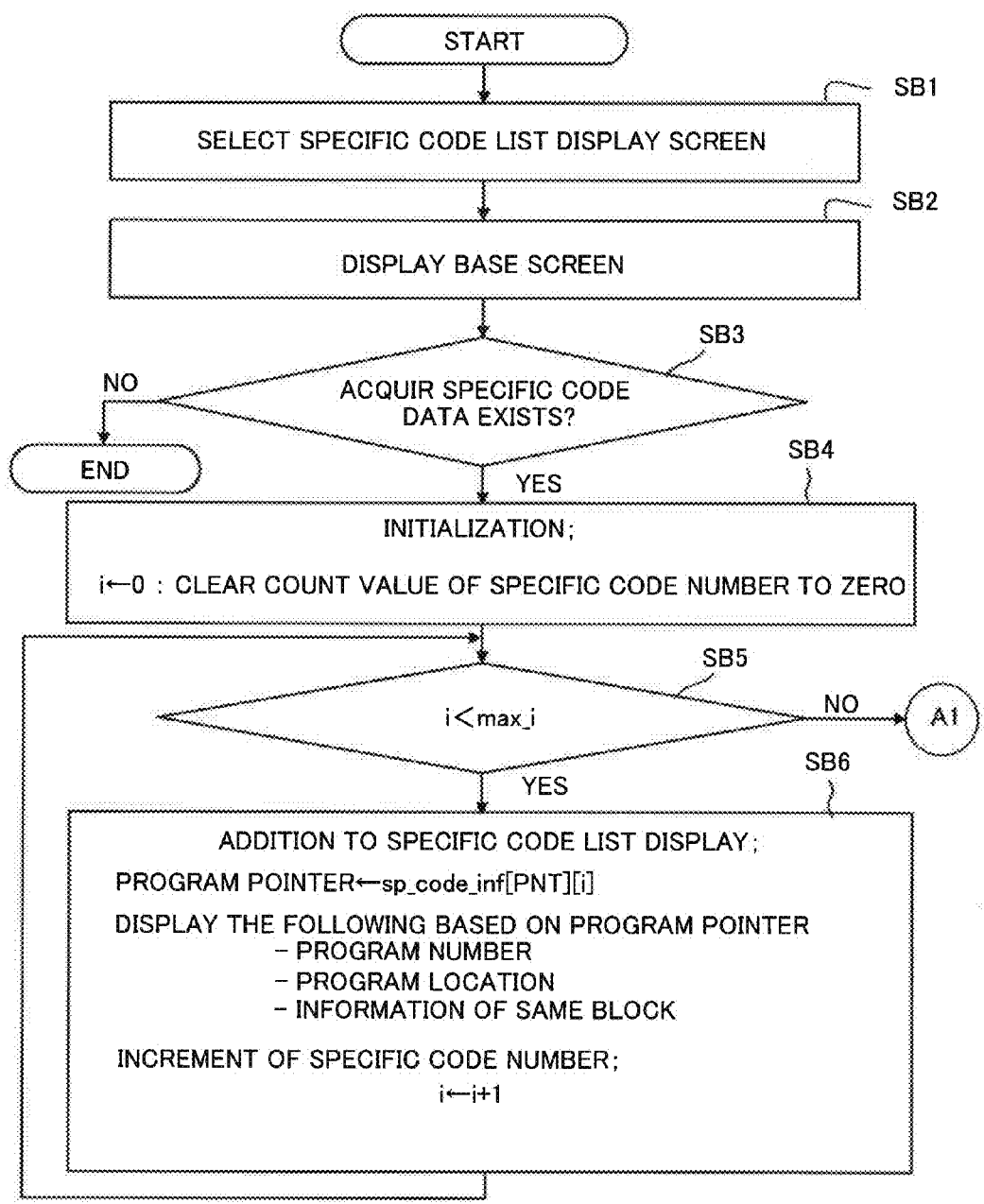
FIGS. 4A, 4B and 4C are flow charts, according to the first embodiment, showing operations of a first display unit, a selection unit for selecting a specific code, a second display unit, and a program restart unit.
Figure 4B:
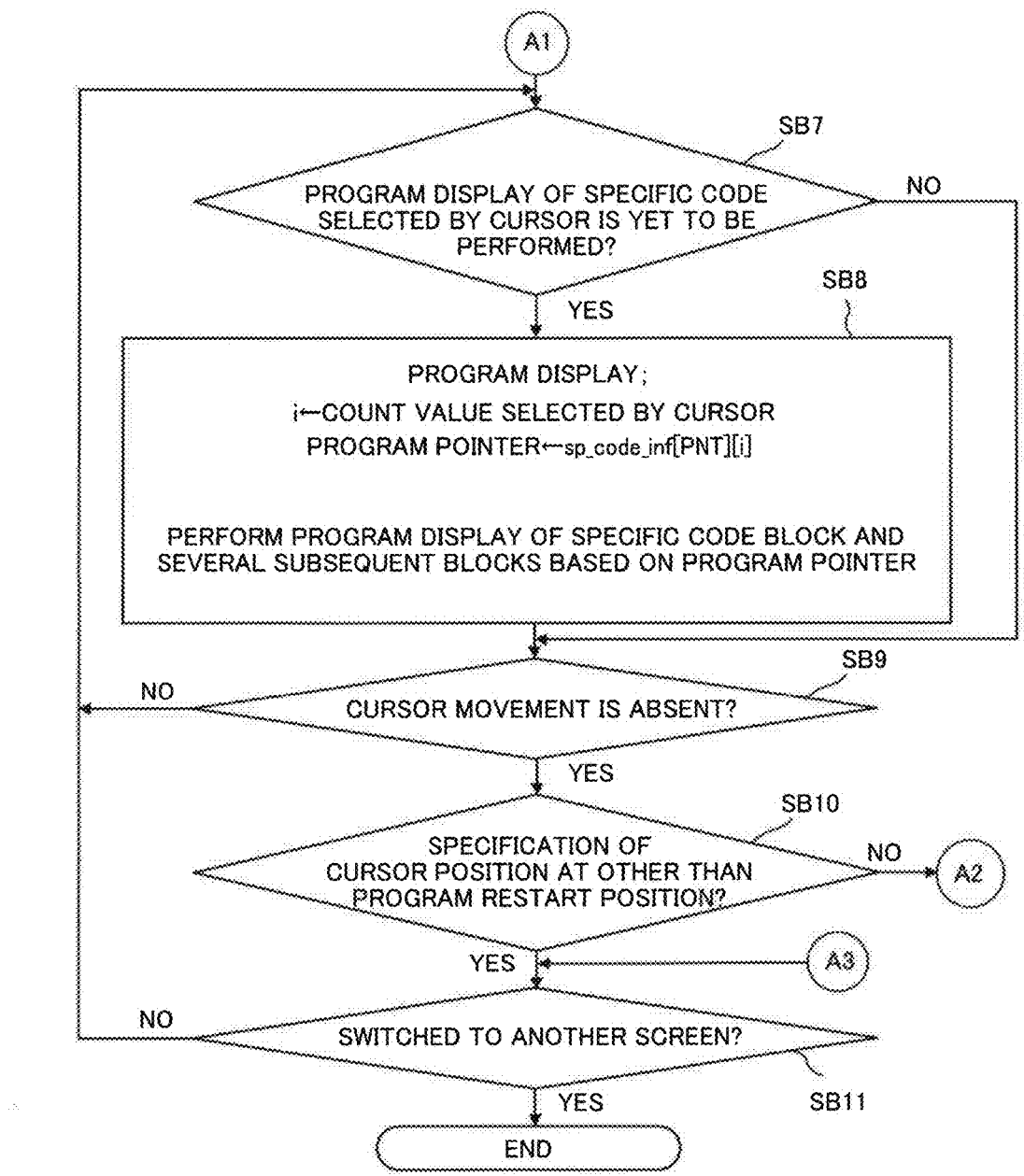
Figure 4C:
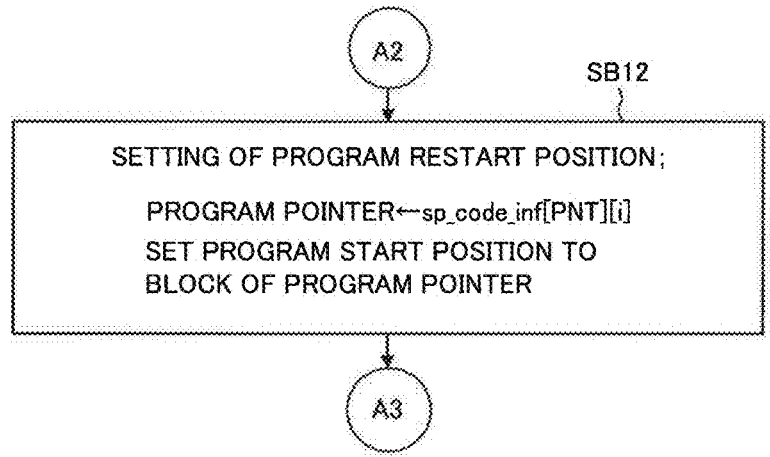

FIGS. 4A, 4B and 4C are flow charts showing operations of a first display unit, a selection unit for selecting a specific code, a second display unit, and a program restart unit. In the following, each step will be described.

(Step SB1) A mode of displaying a specific code list display screen is selected.

(Step SB2) A base screen including items such as NO., PROG., and the like in FIG. 2(b) is displayed.

(Step SB3) A specific code is acquired, and whether data of the specific code exists or not is determined. In the case where there is data of the specific code (YES), the process proceeds to step SB4, and in the case where data of the specific code does not exist (NO), the process is ended.

(Step SB4) An initialization process is performed. The count value of the specific code number i is cleared to zero.

(Step SB5) Whether the specific code number i is smaller than the maximum specific code number max_i is determined. In the case where it is smaller than the maximum specific code number max_i (YES), the process proceeds to step SB6, and in the case where it is equal to or greater than the maximum specific code number (NO), the process proceeds to step SB7.

(Step SB6) A process of addition to the specific code list display is performed. A program pointer that is saved as the location of a specific code is set as the program pointer, and display of the program number, the program location, and information of the same block at the program pointer is performed. Also, one is added to the specific code number i, and the process is returned to step SB5.

(Step SB7) Whether program display for the specific code selected by a selection operation by a cursor is yet to be performed is determined. In the case where display is yet to be performed (YES), the process proceeds to step SB8, and in the case where display is already performed (NO), the process proceeds to SB9.

(Step SB8) Program display is performed. The count value of the item selected by the cursor is set as the specific code number i, and the program pointer of the specific code that is saved, corresponding to the specific code number i, is set as the program pointer. Then, program display is performed for the specific code block and a predetermined number of blocks to be subsequently executed according to the program counter based on the program pointer.

(Step SB9) Whether the cursor is moved is determined. In the case of absence of cursor movement (YES), the process proceeds to step SB10, and in the case of presence of cursor movement (NO), the process is returned to step SB7.

(Step SB10) Whether the current cursor position is specified as the program restart position is determined. In the case of specification as other than the program restart position (YES), the process proceeds to step SB11, and in the case of specification as the program restart position (NO), the process proceeds to step SB12.

(Step SB11) Whether switching to another screen is performed is determined. In the case switching to another screen is performed (YES), the process is ended, and in the case switching is not performed (NO), the process is returned to step SB7.

(Step SB12) The program restart position is set. The program pointer of the specific code that is saved, corresponding to the specific code number i, is set as the program pointer. Then, the program start position is set to the block of the program pointer, and the program is restarted from the position. Then, the process proceeds to step SB11.

Second Embodiment

As the timing of analyzing a machining program and detecting a specific code by the analysis/detection unit, the following timings are conceivable.

(1) Immediately before start of execution of machining program
(2) During execution of machining program
(3) During registration of machining program
(4) At the time of specific code detection request from external input appliance At which timing a specific code is to be detected may be selected by a parameter or the like. For example, setting may be performed in such a way that, in the case where the set value of a parameter for timing setting is one, the machining program is analyzed and a specific code is detected immediately before start of execution of the machining program, and in the case where the set value is two, the machining program is analyzed and a specific code is detected during execution of the machining program.

Detection of a specific code at each timing will be described for each timing.

(1) Immediately Before Start of Execution of Machining Program

Figure 5:
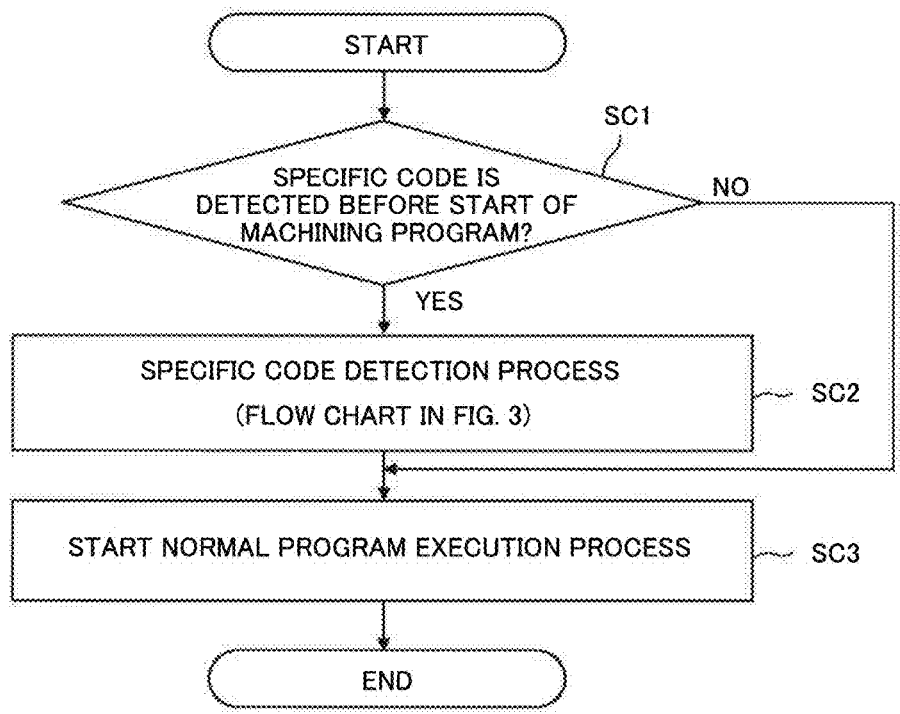
FIG. 5 is a flow chart, according to a second embodiment, showing an operation where immediately before execution of a machining program is taken as the timing for analyzing the machining program and detecting a specific code.

Analysis and detection of a specific code of a machining program is performed at the start of execution of the machining program, and execution of the machining program is started after completion of detection of the specific code. FIG. 5 is a flow chart of an operation where detection of a specific code is performed immediately before start of execution of a machining program. In the following, each step will be described.

(Step SC1) Whether setting is performed by setting of a parameter or the like to detect a specific code before start of a machining program is determined. In the case of detecting a specific code before start of a machining program (YES), the process proceeds to step SC2, and in the case of not detecting a specific code before start of a machining program (NO), the process proceeds to step SC3.

(Step SC2) A specific code detection process is performed. Specifically, the detection process may be performed by the method as shown by the flow chart in FIG. 3.

(Step SC3) A normal program execution process is started.

(2) During Execution of Machining Program

In the case where the number of blocks of a machining program is extremely great, if detection of a specific code is performed at a timing immediately before start of execution of the machining program, starting execution of the machining program may take time. Accordingly, it is possible to have analysis and detection of a specific code performed before start of the machining program until a time set by a parameter or the like, as in the case of (1), and to have execution of the machining program started after the set time is elapsed. Then, at the time of executing, during execution of the machining program, a program block of a specific code not yet analyzed, the analysis/detection process for the specific code is performed together. Also, the analysis/detection process for the specific code is performed at the time of idling of the execution process.

Figure 6A:
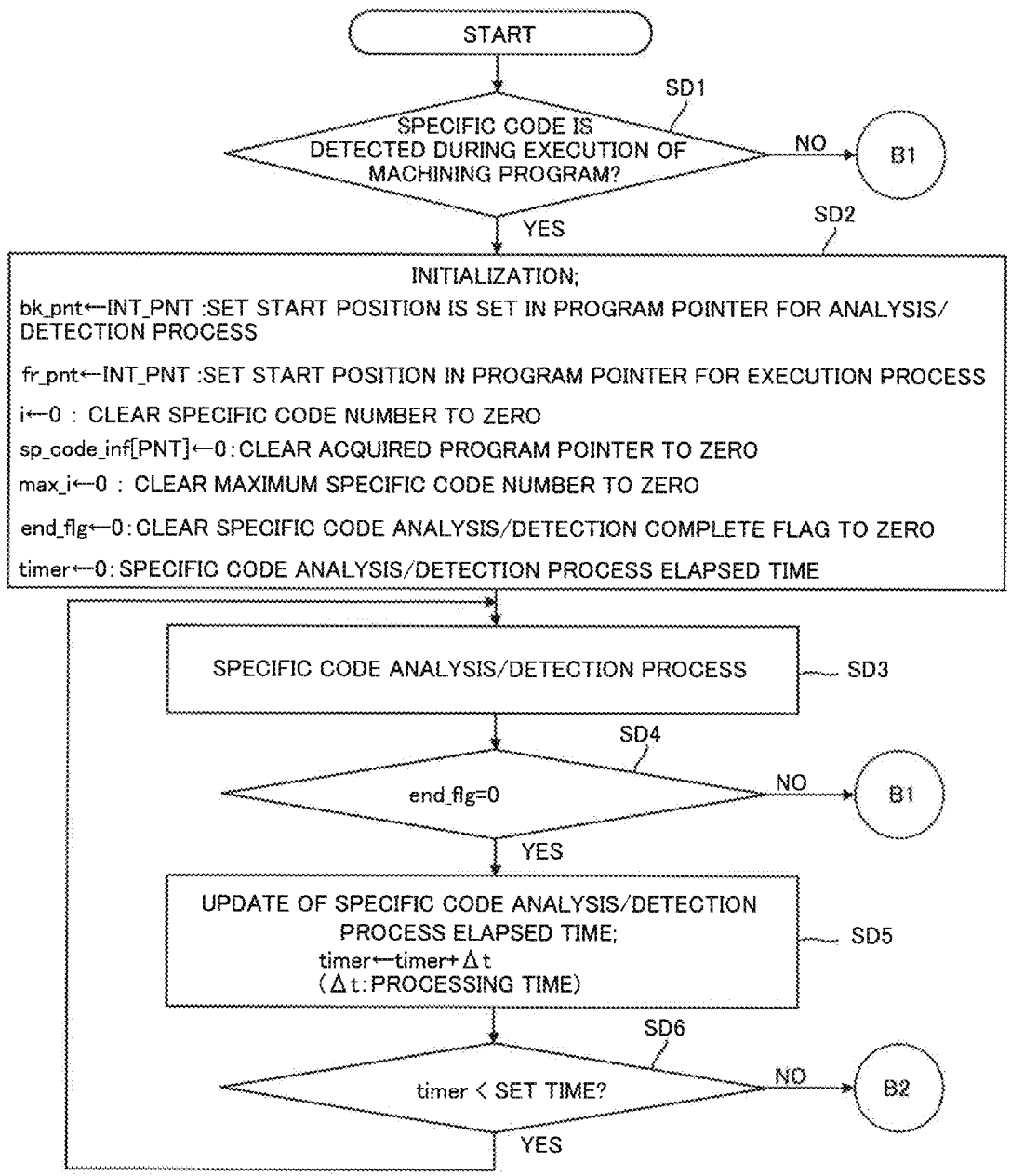
FIGS. 6A, 6B and 6C are flow charts, according to the second embodiment, showing an operation where during execution of a machining program is taken as the timing for analyzing the machining program and detecting a specific code.
Figure 6B:
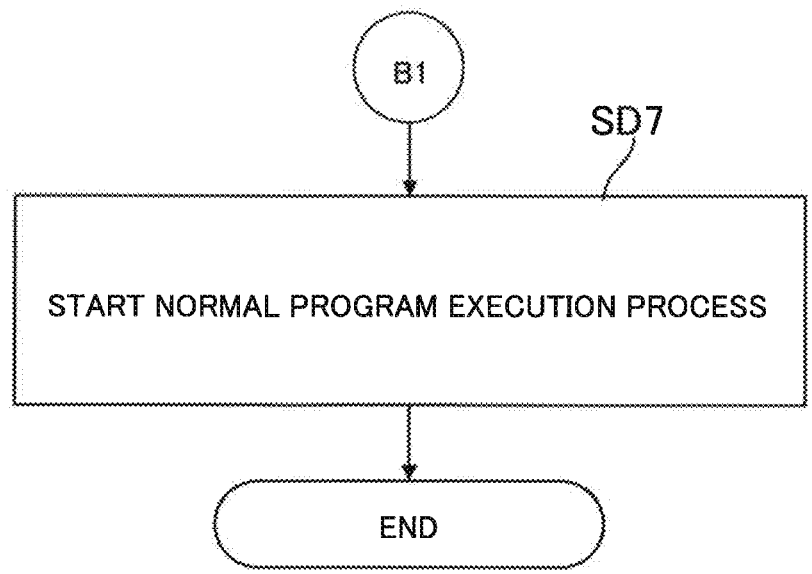
Figure 6C:
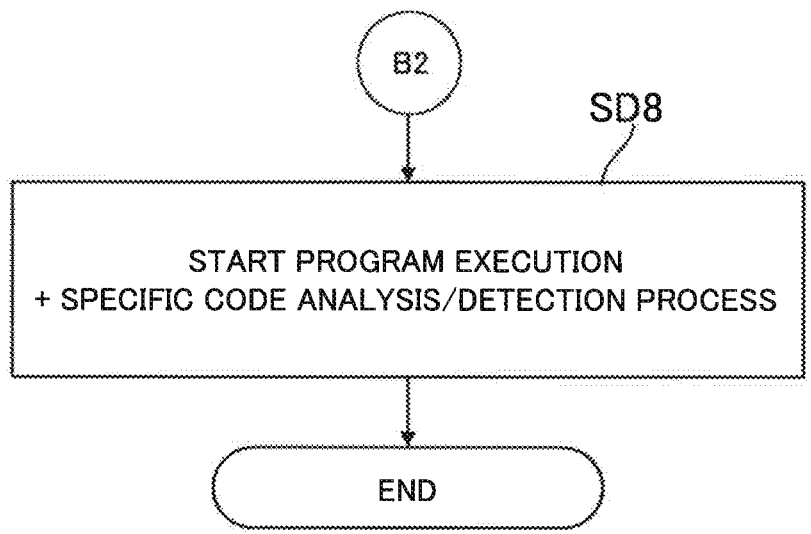

FIGS. 6A, 6B and 6C are flow charts showing an operation of performing detection of a specific code during execution of a machining program. In the following, each step will be described.

(Step SD1) Whether setting is performed by setting of a parameter or the like to detect a specific code during execution of a machining program is determined. In the case of detecting a specific code during execution of a machining program (YES), the process proceeds to step SD2, and in the case of not detecting a specific code during execution of a machining program (NO), the process proceeds to step SD7.

(Step SD2) An initialization operation is performed. A start position is set in the program pointer for the analysis/detection process and in the program pointer for the execution process, and each of a specific code number, an acquired program pointer, a maximum specific code number, a specific code analysis/detection complete flag, and a specific code analysis/detection process elapsed time is cleared to zero.

(Step SD3) A specific code analysis/detection process is performed. Specific processing contents are performed by the method as shown by the flow chart in FIG. 7.

(Step SD4) Whether the specific code analysis/detection complete flag is zero is determined. In the case of zero (YES), the process proceeds to step SD5, and in the case of not being zero (NO), the process proceeds to step SD7.

(Step SD5) A specific code analysis/detection process elapsed time update process is performed. Update is performed by adding a processing time A taken by the specific code analysis/detection process to a specific code analysis/detection process elapsed time timer.

(Step SD6) Whether the specific code analysis/detection process elapsed time timer is below a set time is determined. In the case where it is below the set time (YES), the process is returned to step SD3, and in the case where it is equal to or greater than the set time (NO), the process proceeds to step SD8.

(Step SD7) A normal program execution process is started.

(Step SD8) The specific code analysis/detection process is performed in parallel with the execution of the program. Specific processing contents are performed by the method as shown by the flow chart in FIG. 8.

Figure 7:
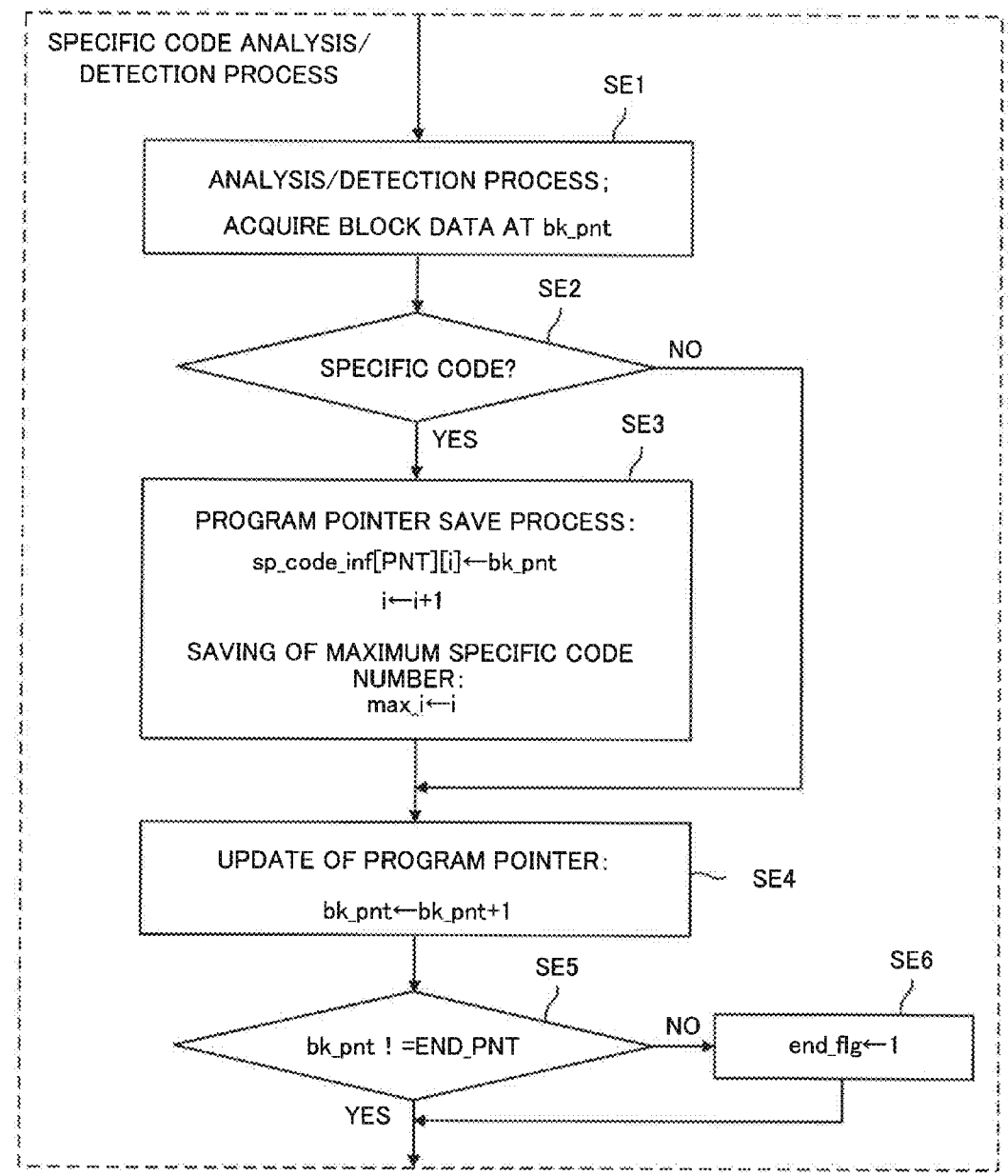
FIG. 7 is a flow chart, according to the second embodiment, showing an operation according to specific processing contents of a specific code analysis/detection process.

Next, specific processing contents of the specific code analysis/detection process in step SD3 and the like in FIGS. 6A, 6B and 6C will be described on a per step basis with reference to the flow chart in FIG. 7.

(Step SE1) An analysis/detection process is performed. Block data at a program pointer bk_pnt for the analysis/detection process is acquired.

(Step SE2) Whether the acquired block data corresponds to the specific code is determined. In the case where it corresponds to the specific code (YES), the process proceeds to step SE3, and in the case where it does not correspond to the specific code (NO), the process proceeds to step SE4.

(Step SE3) A process of saving the program pointer at a portion which is the specific code as sp_code_inf[PNT][i], and a process of adding one to the value of i are performed as a program pointer saving process, and a process of saving i in max_i is performed as a maximum specific code number saving process.

(Step SE4) An update process is performed by adding one to the program pointer bk_pnt.

(Step SE5) Whether the program pointer bk_pnt is other than END_PNT is determined. In the case where it is other than END_PNT (YES), the process is ended and is returned to the original flow chart, and if otherwise (NO), the process proceeds to step SE6.

(Step SE6) One is set in the specific code analysis/detection complete flag end_flg, and the process is ended and is returned to the original flow chart.

Figure 8:
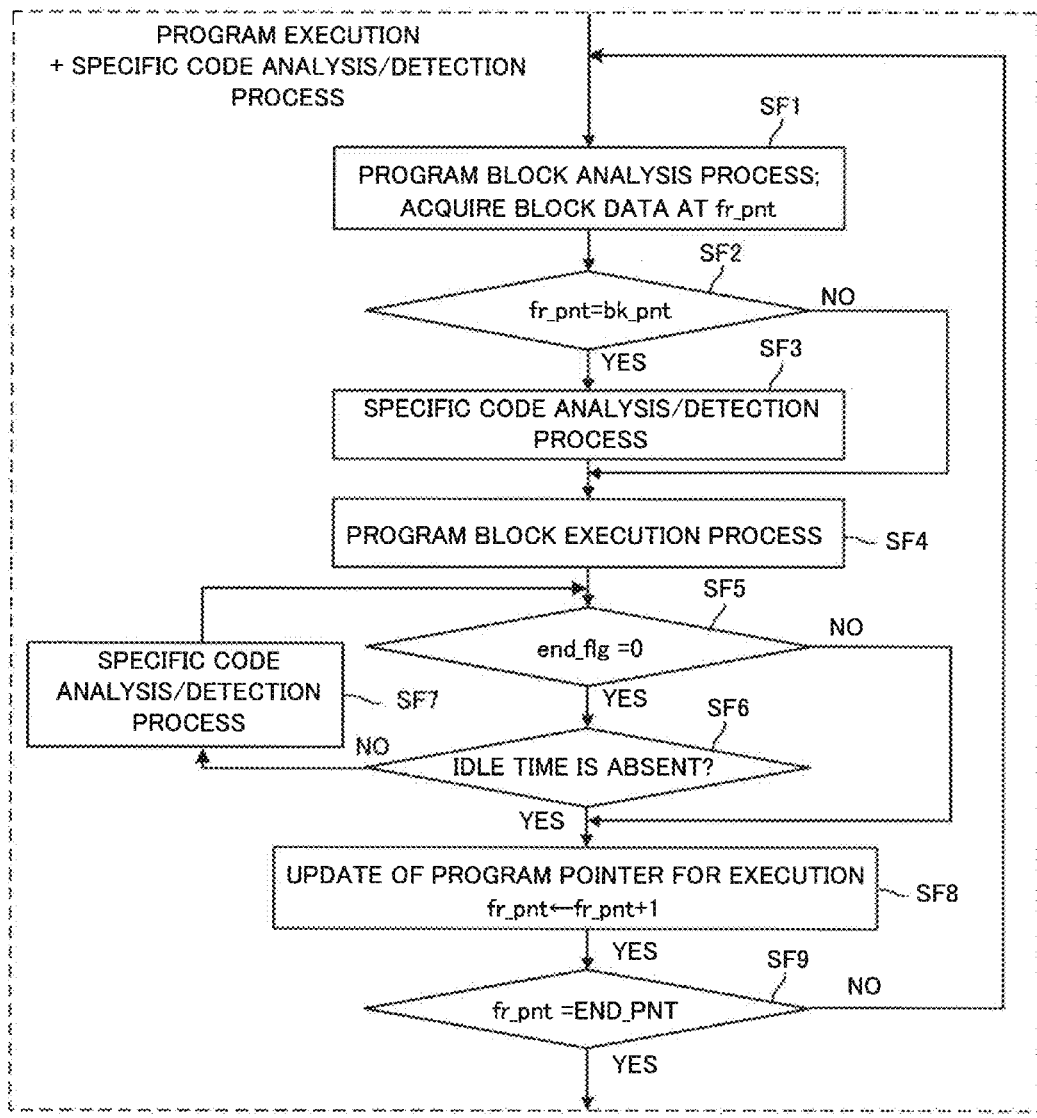
FIG. 8 is a flow chart, according to the second embodiment, showing an operation according to specific processing contents of the specific code analysis/detection process together with program execution.

Next, specific processing contents of the specific code analysis/detection process will be described on a per step basis with reference to the flow chart in FIG. 8, together with program execution in step SD8 in FIG. 6C and the like.

(Step SF1) A program block analysis process is performed. Block data at a program pointer fr_pnt of the execution process is acquired.

(Step SF2) Whether the program pointer fr_pnt of the execution process is the same as the program pointer bk_pnt of the analysis/detection process is determined. In the case where they are the same (YES), the process proceeds to step SF3, and in the case where they are different (NO), the process proceeds to step SF4.

(Step SF3) The specific code analysis/detection process is performed. Specifically, the process is performed by the procedure shown by the flow chart in FIG. 7.

(Step SF4) An execution process of the program block is performed.

(Step SF5) Whether the specific code analysis/detection complete flag end_flg is zero is determined. In the case where it is zero (YES), the process proceeds to step SF6, and in the case where it is not zero (NO), the process proceeds to step SF8.

(Step SF6) Whether idle time is absent is determined. In the case where there is no idle time (YES), the process proceeds to step SF8, and in the case where there is idle time (NO), the process proceeds to step SF7.

(Step SF7) The specific code analysis/detection process is performed. Specifically, the process is performed by the procedure shown by the flow chart in FIG. 7. After this process, the process is returned to step SF5.

(Step SF8) The program pointer fr_pnt of the execution process is updated by addition of one.

(Step SF9) Whether the program pointer fr_pnt of the execution process is the same as END_PNT is determined. In the case where they are the same (YES), the process is ended and is returned to the original flow chart, and in the case where they are different (NO), the process is returned to step SF1.

(3) During Registration of Machining Program

At the time of registering a machining program in the memory of the numerical control device, analysis and detection of a specific code are to be performed with respect to a machining program specified in advance. Generally, the head code of a program name is fixed (for example, "O"), and thus determination of whether a program to be saved is a specified program is possible. Additionally, unlike analysis/detection of (1), (2) and (4) described later, with the analysis during program registration, analysis/detection of a specific code is not performed for another machining program that is invoked by a specified machining program. Also, a specified machining program is taken as the main setting (whose execution is expected to be started).

Figure 9:
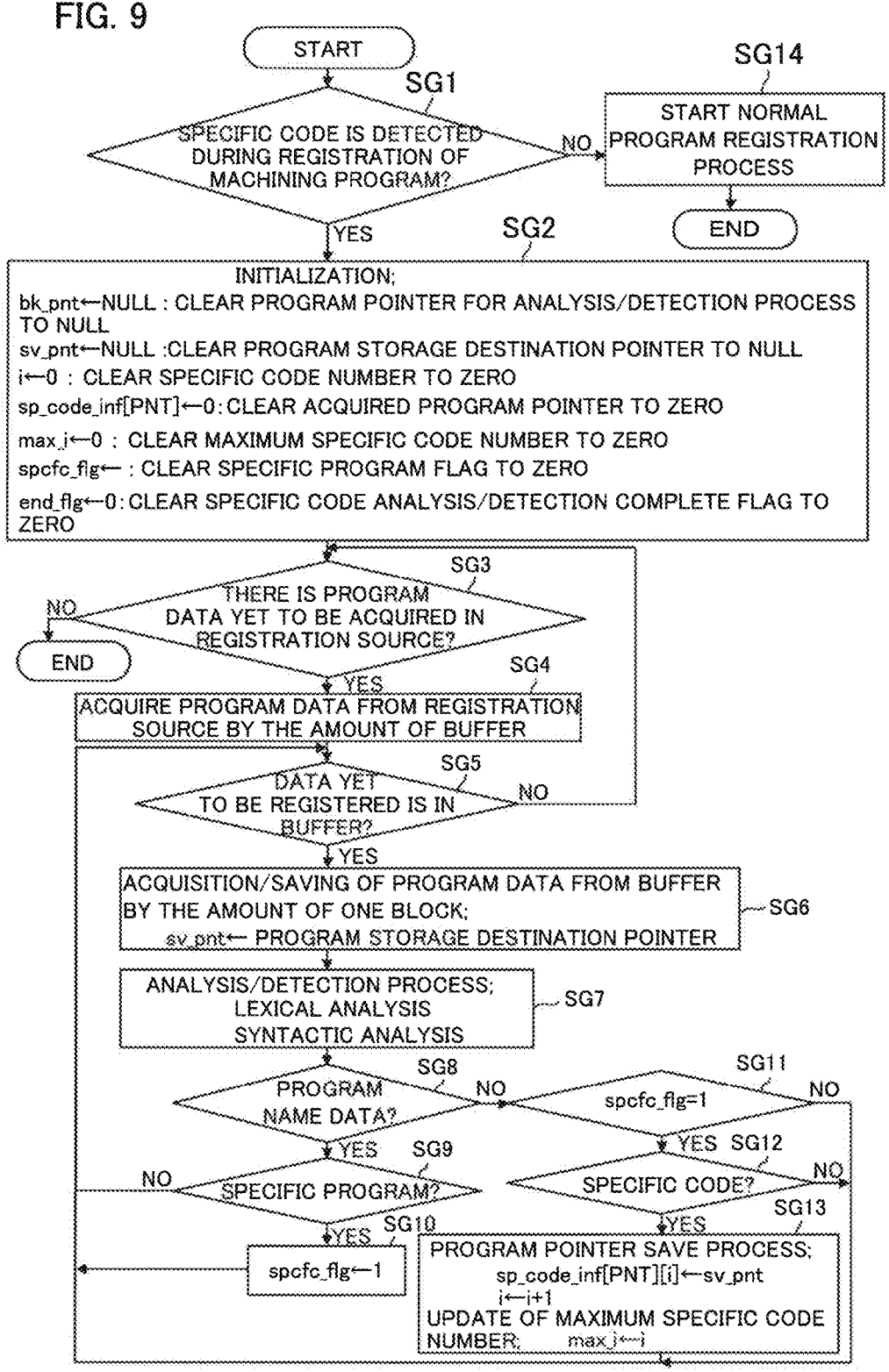
FIG. 9 is a flow chart, according to the second embodiment, where during registration of a machining program is taken as the timing for analyzing the machining program and detecting a specific code.

FIG. 9 is a flow chart showing an operation of performing detection of a specific code during registration of a machining program. In the following, each step will be described.

(Step SG1) Whether setting is performed by setting of a parameter or the like to detect a specific code during registration of a machining program is determined. In the case of detecting a specific code during registration of a machining program (YES), the process proceeds to step SG2, and in the case of not detecting a specific code during registration of a machining program (NO), the process proceeds to step SG14.

(Step SG2) An initialization operation is performed. The program pointer for the analysis/detection process and a program storage destination pointer are cleared to NULL, and each of a specific code number, an acquired program pointer, a maximum specific code number, a specific program flag, and a specific code analysis/detection complete flag is cleared to zero.

(Step SG3) Whether there is program data that is yet to be acquired in the registration source is determined. In the case where there is program data that is yet to be acquired (YES), the process proceeds to step SG4, and in the case where there is no program data that is yet to be acquired (NO), the process is ended.

(Step SG4) Program data is acquired from the registration source by the amount of the buffer.

(Step SG5) Whether data that is yet to be registered is present in the buffer is determined. In the case where there is data that is yet to be registered (YES), the process proceeds to step SG6, and in the case where there is no data that is yet to be registered (NO), the process is returned to step SG3.

(Step SG6) Program data is acquired from the buffer by the amount of one block, and is saved.

The program storage destination pointer at this time is saved in a program storage destination pointer sv_pnt.

(Step SG7) An analysis/detection process is performed. Lexical analysis (a process of sorting into alphabets and numbers), and syntactic analysis (a process of determining a set of alphabets and numbers indicated by a command) are performed.

(Step SG8) Whether the result of the analysis/detection process is program name data is determined. In the case of program name data (YES), the process proceeds to step SG9, and in the case of other than program name data (NO), the process proceeds to step SG11.

(Step SG9) Whether the result of the analysis/detection process is a specific program is determined.

In the case of a specific program (YES), the process proceeds to step SG10, and in the case of other than a specific program (NO), the process is returned to step SG5.

(Step SG10) One is set to a specific program flag spcfc_flg, and the process is returned to step SG5.

(Step SG11) Whether the value of the specific program flag spcfc_flg is one is determined. In the case where it is one (YES), the process proceeds to step SG12, and in the case of other than one (NO), the process is returned to step SG5.

(Step SG12) Whether the result of the analysis/detection process is a specific code is determined. In the case where it is a specific code (YES), the process proceeds to step SG13, and in the case of other than a specific code (NO), the process is returned to step SG5.

(Step SG13) A program pointer save process is performed. The program storage destination pointer is saved in sp_code_inf[PNT][i], and update is performed by adding one to i. Also, update is performed by saving i in the maximum specific code number max_i.

(Step SG14) A normal program registration process is started.

(4) At the Time of Specific Code Detection Request from External Input Appliance For example, analysis and detection of a specific code is performed with respect to a machining program which is currently the main setting (whose execution is expected to be started) at the time of specific code detection request from an external input appliance by signal input or the like.

Figure 10:
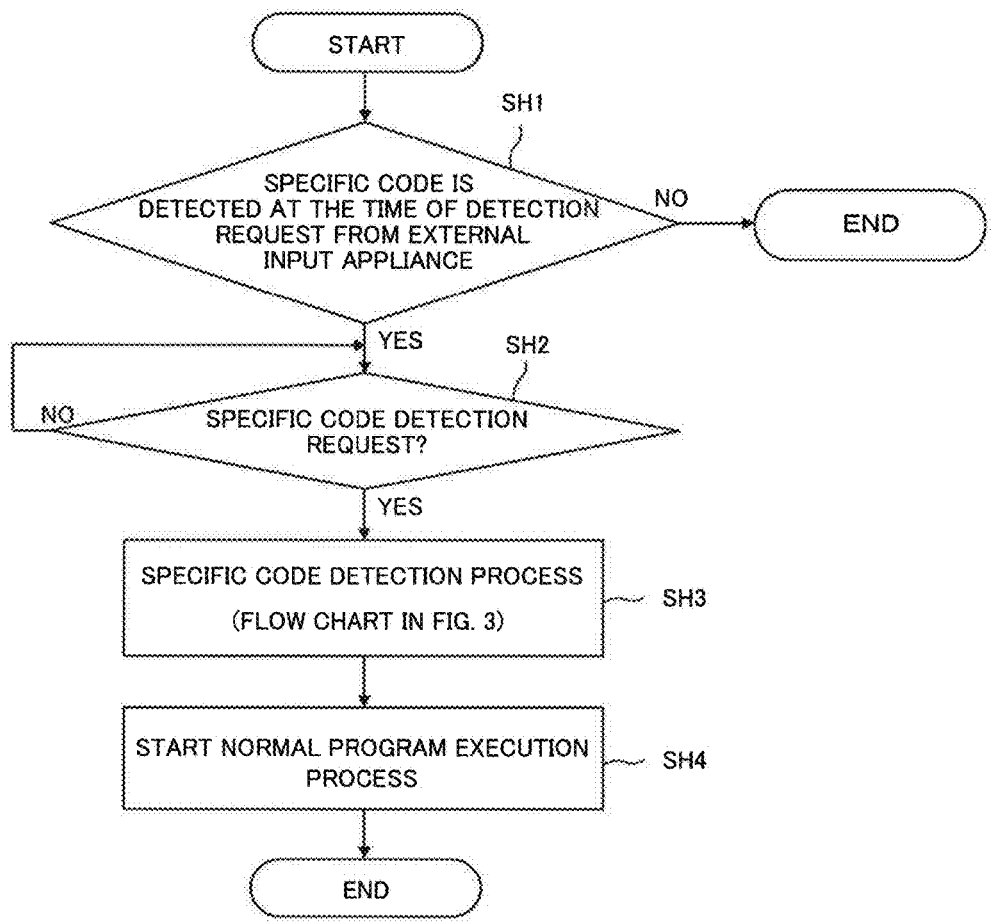
FIG. 10 is a flow chart, according to the second embodiment, where the time of specific code detection request from an external input appliance is taken as the timing for analyzing the machining program and detecting a specific code.

FIG. 10 is a flow chart showing an operation of performing detection of a specific code at the time of a specific code detection request from an external input appliance. In the following, each step will be described.

(Step SH1) Whether setting is performed by setting of a parameter or the like to detect a specific code at the time of a detection request from an external input appliance is determined. In the case of detecting a specific code at the time of a detection request from an external input appliance (YES), the process proceeds to step SH2, and in the case of not detecting a specific code at the time of a detection request from an external input appliance (NO), the process is ended.

(Step SH2) Whether there is a detection request regarding a specific code is determined. In the case where there is a detection request (YES), the process proceeds to step SH3, and in the case where there is no detection request (NO), step SH2 is repeatedly performed, and standby is continued until there is a detection request.

(Step SH3) A specific code detection process is performed. Specifically, the process is performed by the procedure as shown by the flow chart in FIG. 3.

(Step SH4) A normal program execution process is started.

Third Embodiment

By adding an item allowing input of execution sequence (SEQ) in the display of the specific code list according to the first embodiment, the execution sequence of the steps may be changed without changing the actual program. For example, in the case of the example shown in FIG. 11, the sequence is changed to prevent steps 2 and 3 from being executed, as described below, by causing a program end command (M30) to be executed before their turn comes.

As the process for changing the execution sequence, the execution sequence is also stored in addition to the program pointer at the time of saving of information regarding the specific code ("sp_code_inf[SEQ]" in the flow chart).

As the method used at the time of changing, an automatic rearrangement method and a manual rearrangement method are conceivable, for example. In the case of the former, for example, in the case of changing the sequence of a selected step from the second to the third, the step which was originally the third is automatically changed to be the second. In the case of the latter, in the case of changing the sequence of a selected step from the second to the third in the same manner, the step which was originally the third stays the third. In this case, at the time of program execution, after the first step is ended, steps that are set to the third are executed because there is no step that is set to the second; however, since two or more steps are set to the third, one that is detected earlier is executed. After this step is executed, a step that is set to the fourth is executed, and a third step which was not executed is skipped. Also, in the case where the sequence is set that is greater than the number of specific codes detected, the corresponding step is skipped as in the case where zero is set.

Figure 16A:
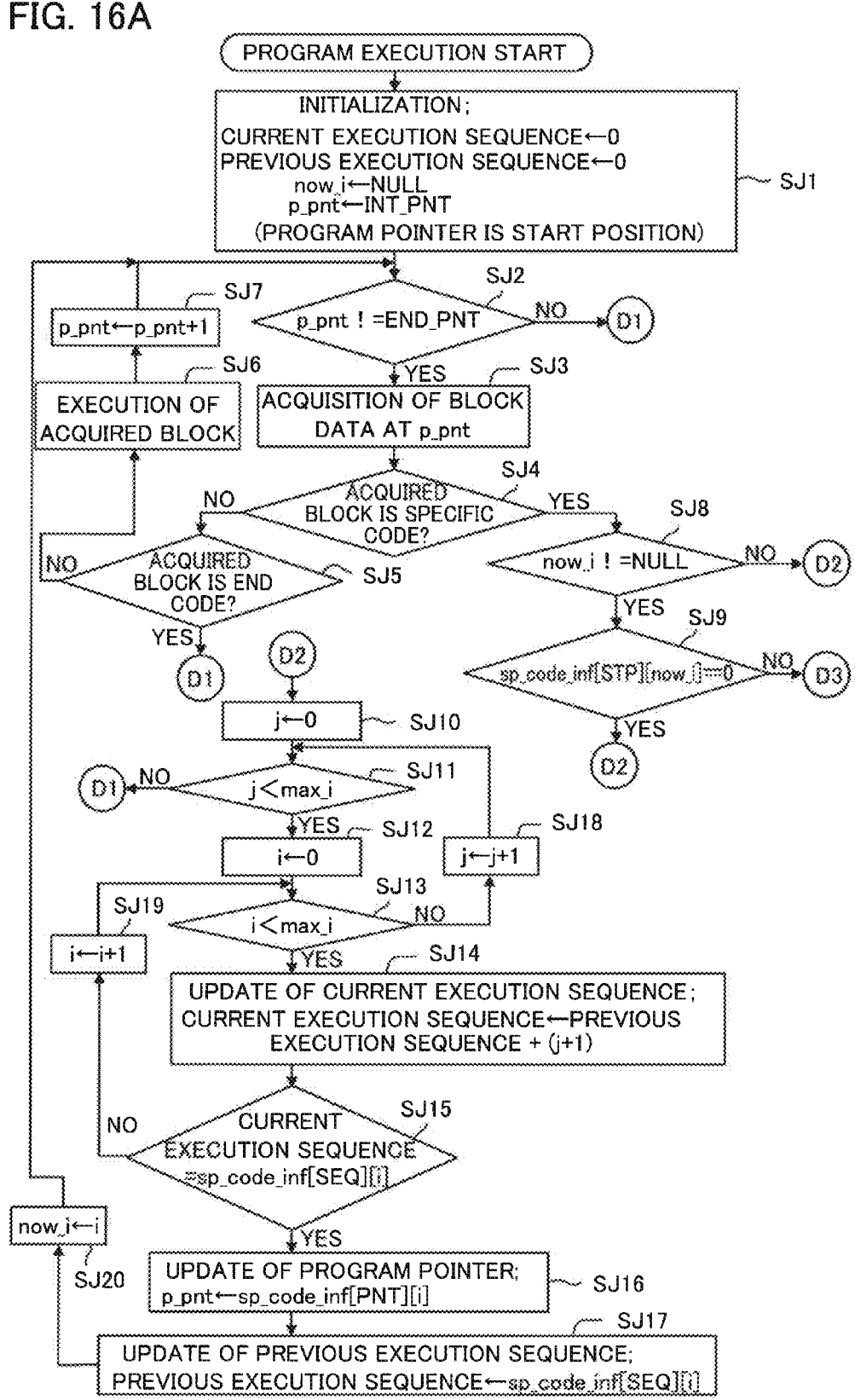
FIGS. 16A, 16B and 16C are flow charts, according to the third and the fourth embodiments, showing operations of execution of specification of the sequence of a machining step, detection of end of a machining step, and execution of pause.
Figure 16B:
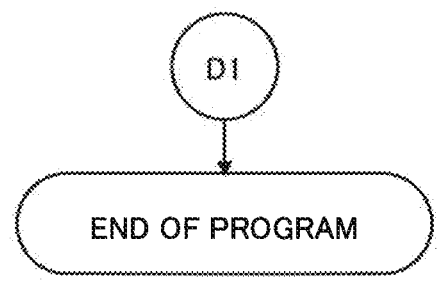
Figure 16C:
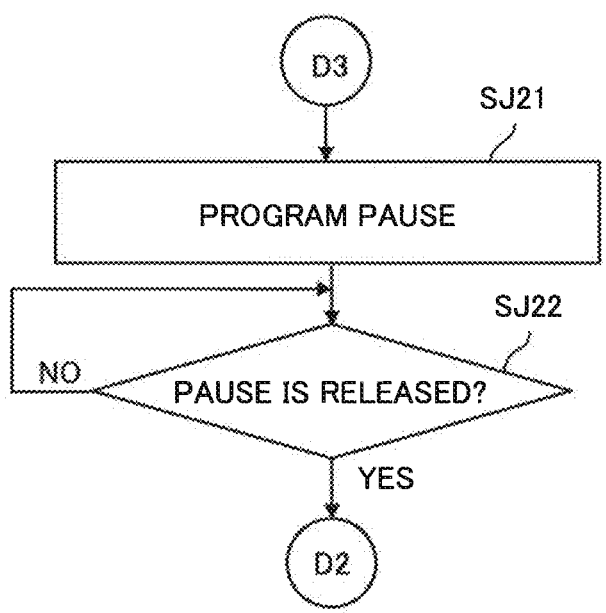

With respect to an algorithm for changing the execution sequence during execution of a program, when a specific code block is reached, a program counter of a specific code having the same execution sequence as the execution sequence of a preceding specific code block to which one is added is retrieved by an algorithm as shown by the flow charts in FIGS. 16A, 16B and 16C, and corresponding blocks are sequentially read and executed by using the program pointer, and the execution sequence is thus changed. Also, as in the case of the manual rearrangement method described above, in the case where there is no step of a specific code having the same execution sequence as the execution sequence of a preceding specific code block to which one is added, a step of a specific code having the same execution sequence as the value obtained by further adding one is retrieved.

Figure 11:
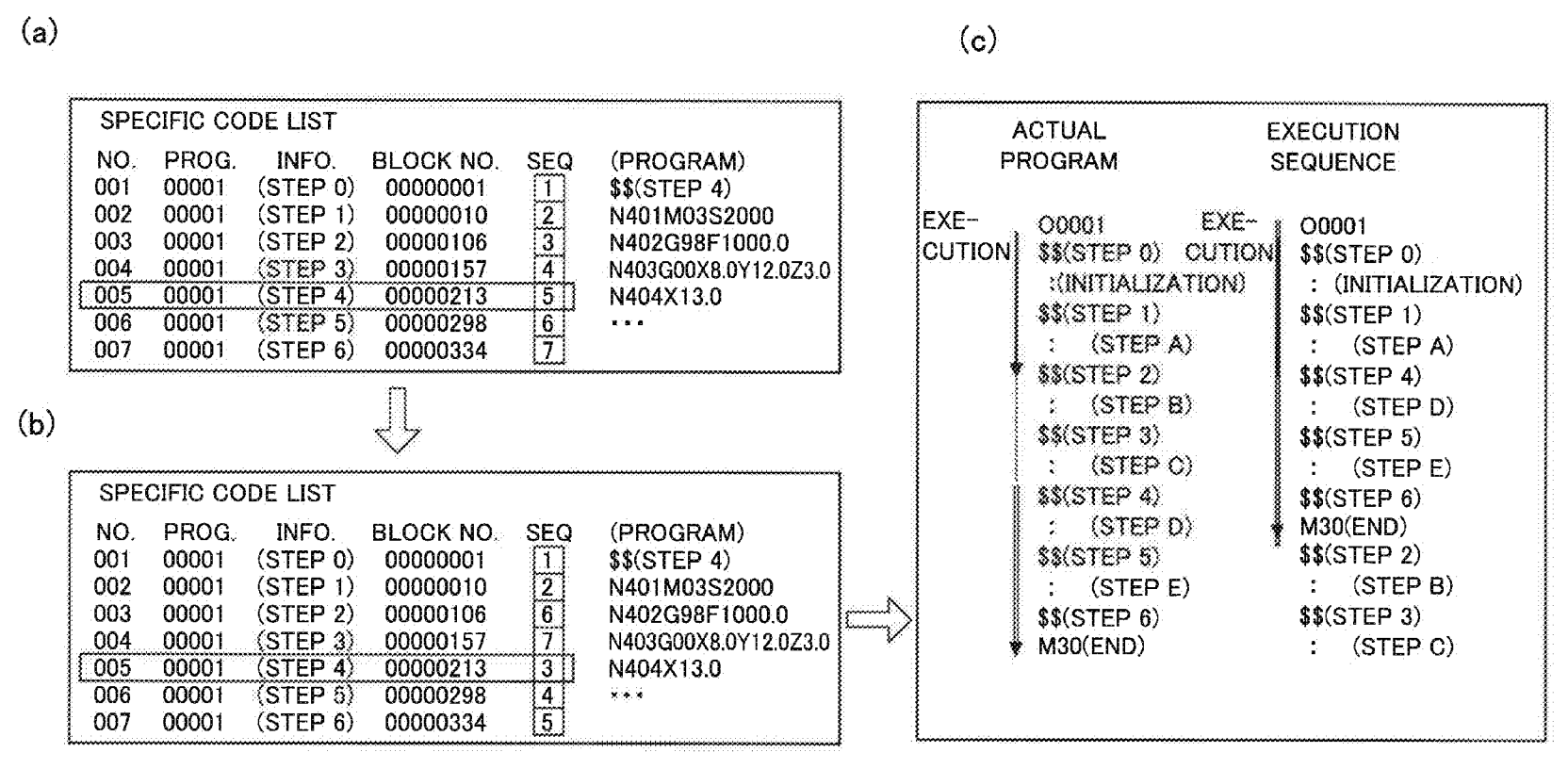

FIG. 11 shows an example of a machining program. FIGS. 11(a) and 11(b) show lists of machining programs, and display, in addition to the items of the detection number (No.), the machining program name (PROG.), specific code block information (INFO.), and the position of a specific code on the machining program (BLOCK NO.), an item allowing input of the execution sequence (SEQ). Each of these data may be acquired by a saved program pointer. Also, on the right side, several blocks after the specific code of the selected step, STEP 4, are displayed as (PROGRAM).

In FIG. 11(a), the execution sequence (SEQ) is arranged according to the initial execution sequence, but the execution sequence (SEQ) may be changed as specified by an operator. FIG. 11(b) shows the state of changing the execution sequence (SEQ), and STEP 4 is selected and is changed from the fifth in the execution sequence to the third, and the execution sequence (SEQ) is changed accordingly for other steps.

FIG. 11(c) shows the actual program and the execution sequence with respect to the machining program. On the left side in FIG. 11(c), the name of a program "O0001" is shown in the top row, and then, there are an initialization step as STEP 0, a step A as STEP 1, a step B as STEP 2, . . . , and lastly, an end step in STEP 6 in the sequence of the original machining execution. Moreover, "$$" which is a specific code for indicating the limit point of a step is added to the beginning of each step. With respect to such a machining program, the machining program is analyzed at an arbitrary timing, and a specific code is detected and the program pointer of a specific code is saved in the order of detection. As in the first embodiment and the like, the limit point of each step may thereby be recognized.

Due to the change in the execution sequence (SEQ) in FIG. 11(b), the actual execution sequence will be as shown on the right side in FIG. 11(c). According to the order of the execution sequence (SEQ) in FIG. 11(b), the step D "STEP 4" is executed after the step A "STEP 1". Then, the end step "STEP 6" is executed as the fifth step, and thus the process is ended without the execution of the step B "STEP 2" and the step C "STEP 3".

The flow of the operation of the present embodiment will be described more specifically together with the fourth embodiment below.

Fourth Embodiment

By adding an item allowing input of a pause reservation (STP) in the display of the specific code list according to the first to the third embodiments, it becomes possible to pause the machining program at the timing of end of a desired step. For example, in the case of the example shown in FIG. 12, the machining program is paused at the time of end of the step D as will be described later.

As a pause reservation process, a pause reservation flag is added in the information about each specific code in addition to the program pointer and the execution sequence ("Sp_code_inf[STP]") in the flow chart.)

Here, by checking the pause reservation flag when a specific code block is reached during execution of the program, pause may be performed after a step whose pause reservation flag is on is ended.

Figure 12:
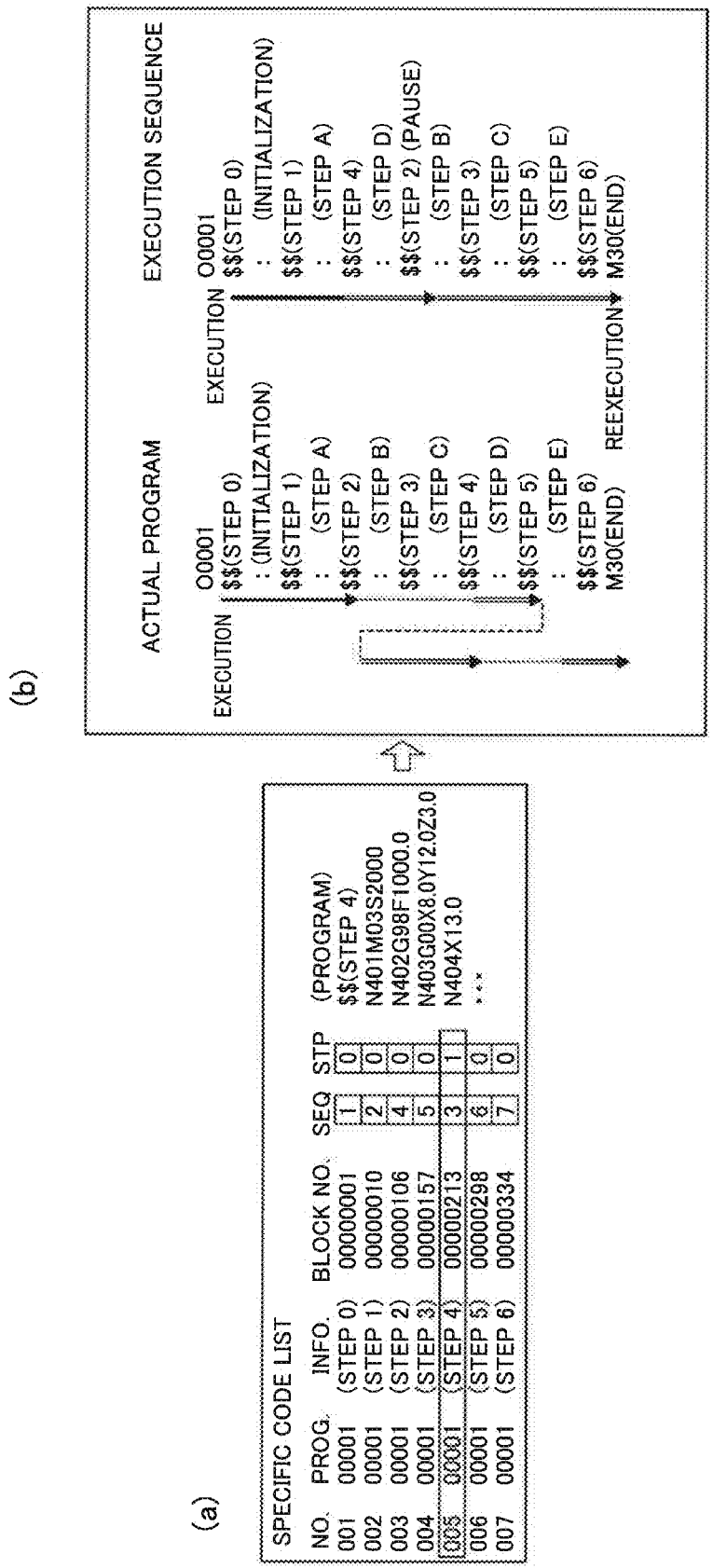
FIG. 12 is a diagram showing an example of a machining program according to a fourth embodiment.
Figure 13A:
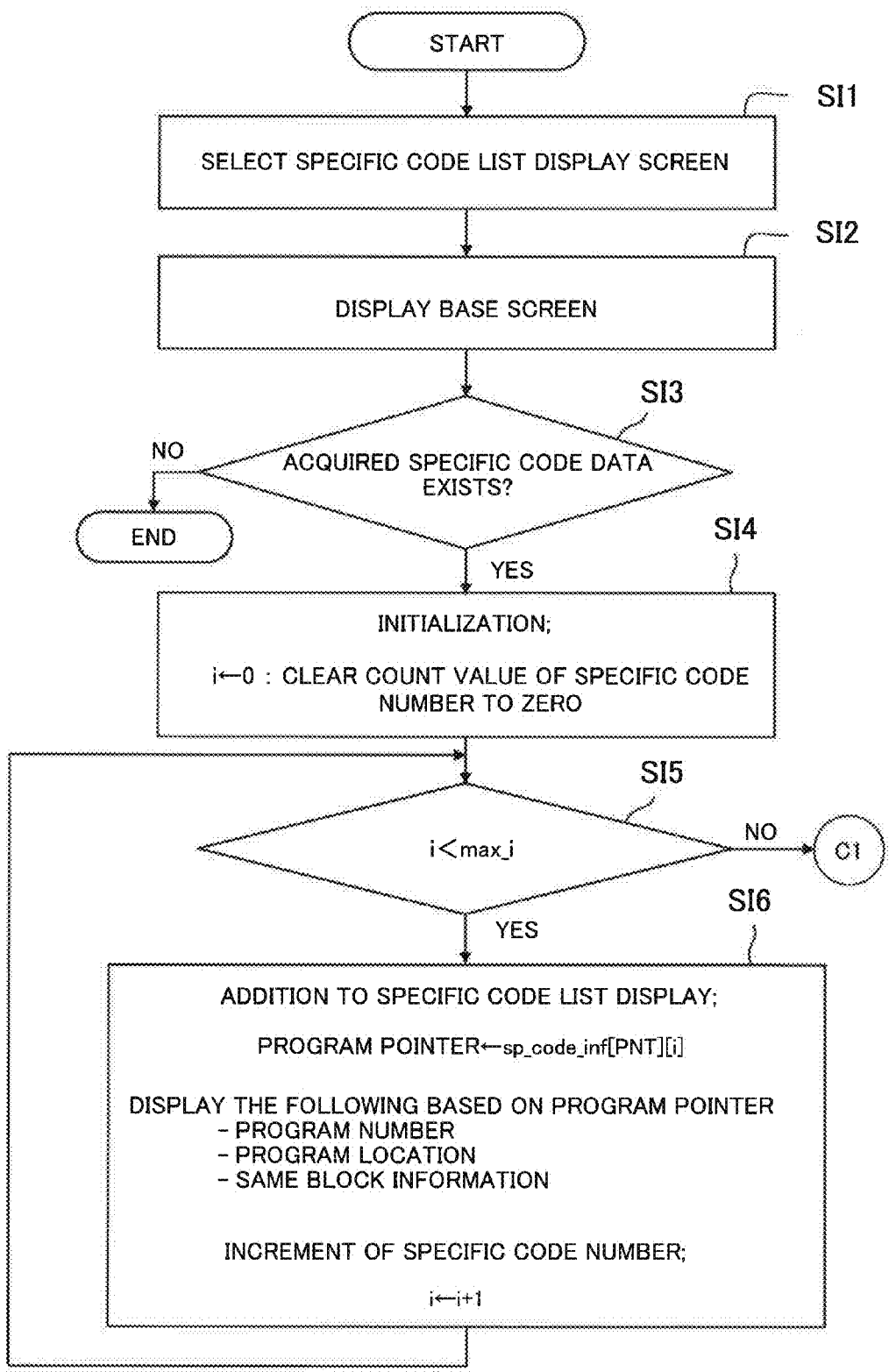
FIGS. 13A and 13B are flow charts, according to the third and the fourth embodiments, showing operations of changing of the sequence of steps and pause reservation (part 1)
Figure 13B:
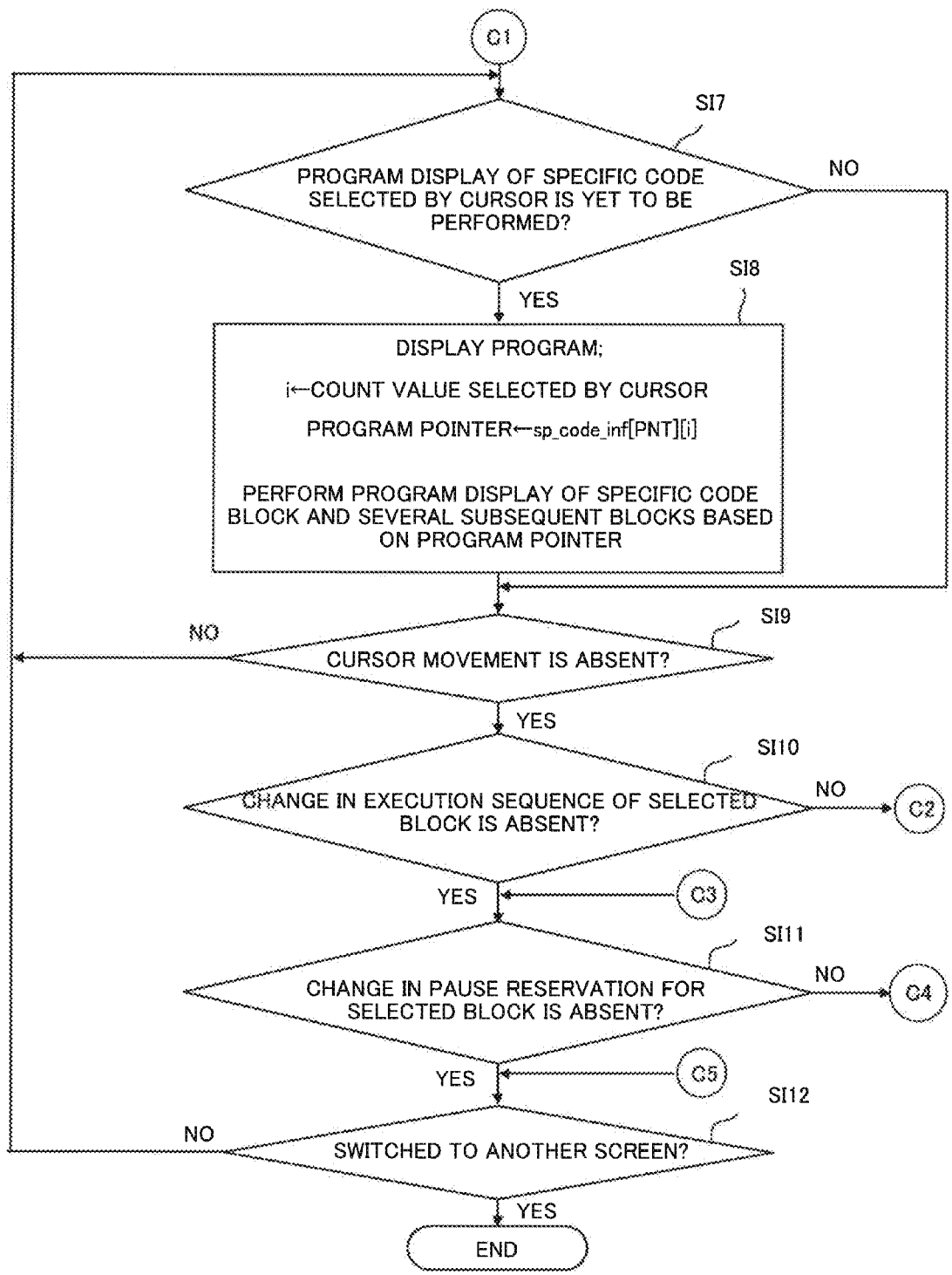
Figure 14:
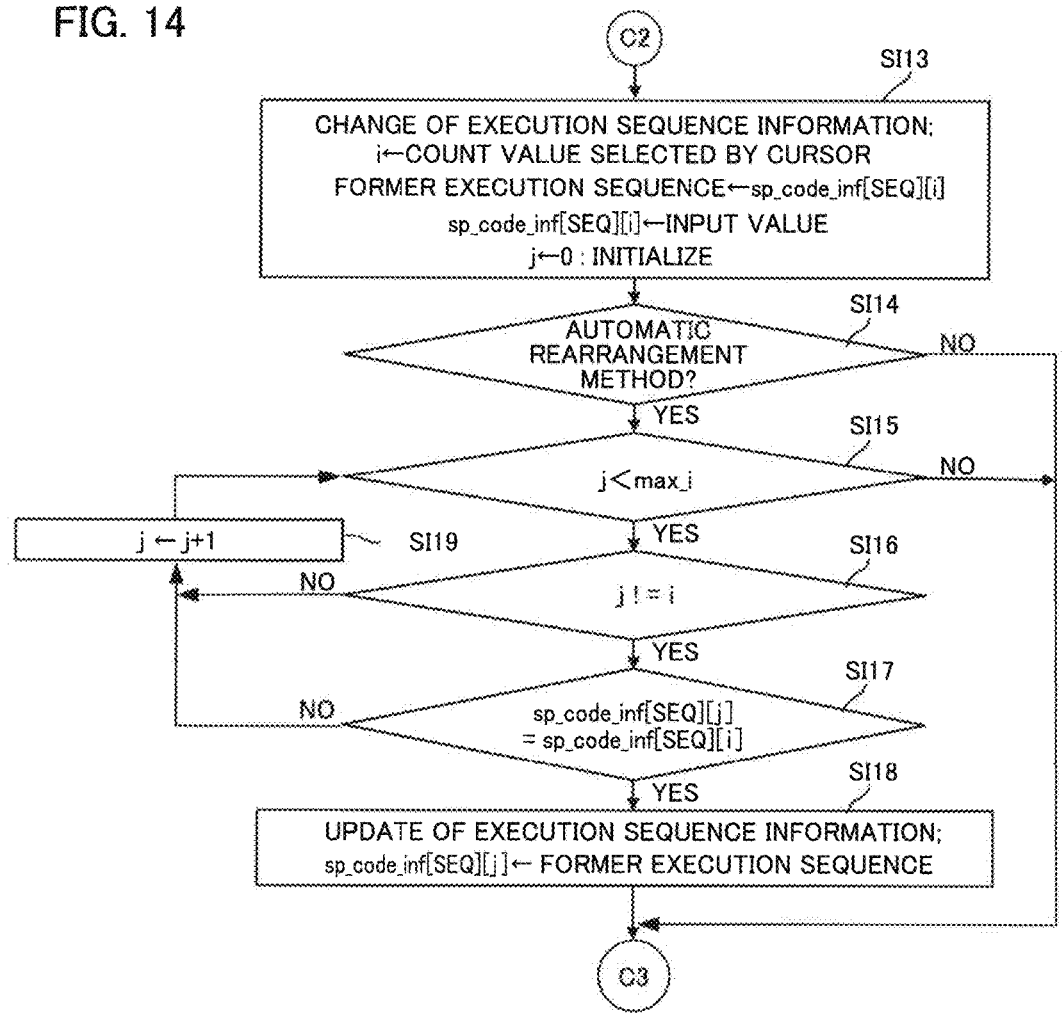
FIG. 14 is a flow chart, according to the third and the fourth embodiments, showing operations of changing of the sequence of steps and pause reservation (part 2)
Figure 15:
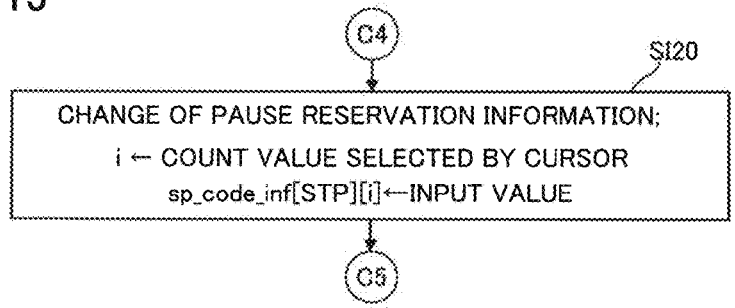
FIG. 15 is a flow chart, according to the third and the fourth embodiments, showing operations of changing of the sequence of steps and pause reservation (part 3)

FIG. 12 shows an example of a machining program. FIG. 12(a) shows a list of machining programs, and display, in addition to the items of the detection number (No.), the machining program name (PROG.), specific code block information (INFO.), the position of a specific code on the machining program (BLOCK NO.), and the execution sequence (SEQ), an item allowing input of pause reservation (STP). Each of these data may be acquired by a saved program pointer. Also, on the right side, several blocks after the specific code of the selected step, STEP D, are displayed as (PROGRAM).

FIG. 12(b) shows the actual program and the execution sequence with respect to the machining program. The actual execution sequence of the machining program is as shown on the right side in FIG. 12(b), as specified as the execution sequence (SEQ). As the order of the execution sequence (SEQ) in FIG. 11(b), a step D "STEP 4" is executed after a step A "STEP 1". Here, as shown in FIG. 12(a), pause reservation (STP) is set in STEP 4, and thus, pause is executed after the step D "STEP 4" is ended. Then, when a re-execution command is issued, the operation is restarted from the paused time point.

The flow of the operation of the present embodiment will be described more specifically together with the fourth embodiment below.

Next, the operations of the third and the fourth embodiments will be described with reference to the flow charts in FIGS. 13A and 13B, FIG. 14, FIG. 15, and FIGS. 16A, 16B and 16C.

First, the operations of changing of the sequence of the steps and the pause reservation will be described with reference to FIGS. 13A and 13B, FIG. 14, and FIG. 15.

(Step SI1) A mode of displaying a specific code list display screen is selected.

(Step SI2) A base screen including items such as NO., PROG., and the like in FIG. 11(a), FIG. 12(a) and the like is displayed.

(Step SI3) A specific code is acquired, and whether data of the specific code exists or not is determined. In the case where there is data of the specific code (YES), the process proceeds to step SI4, and in the case where data of the specific code does not exist (NO), the process is ended.

(Step SI4) An initialization process is performed. The count value of the specific code number i is cleared to zero.

(Step SI5) Whether the specific code number i is smaller than the maximum specific code number max_i is determined. In the case where it is smaller than the maximum specific code number max_i (YES), the process proceeds to step SI6, and if it is equal to or greater than the maximum specific code number (NO), the process proceeds to step SI7.

(Step SI6) A process of addition to the specific code list display is performed. A program pointer that is saved as the location of a specific code is set as the program pointer, and display of the program number, the program location, and information of the same block at the program pointer is performed. Also, one is added to the specific code number i, and the process is returned to step SI5.

(Step SI7) Whether program display for the specific code selected by a selection operation by a cursor is yet to be performed is determined. In the case where display is yet to be performed (YES), the process proceeds to step SI8, and in the case where display is already performed (NO), the process proceeds to SI9.

(Step SI8) Program display is performed. The count value of the item selected by the cursor is set as the specific code number i, and the program pointer of the specific code that is saved, corresponding to the specific code number i, is set as the program pointer. Then, program display for the specific code block and a predetermined number of blocks to be subsequently performed according to the program counter is performed based on the program pointer.

(Step SI9) Whether the cursor is moved is determined. In the case of absence of cursor movement (YES), the process proceeds to step SI10, and in the case of presence of cursor movement (NO), the process is returned to step SI7.

(Step SI10) Whether a change in the execution sequence of a selected block is absent is determined. In the case of absence of a change (YES), the process proceeds to step SI11, and in the case of presence of a change (NO), the process proceeds to step SI13.

(Step SI11) Whether a change in the pause reservation for the selected block is absent is determined. In the case of absence of a change (YES), the process proceeds to step SI12, and in the case of presence of a change (NO), the process proceeds to step SI20.

(Step SI12) Whether switching to another screen is performed is determined. In the case where switching to another screen is performed (YES), the process is ended, and in the case where switching is not performed (NO), the process is returned to step SI7.

(Step SI13) Execution sequence information is changed. The count value of the item selected by the cursor is set as the specific code number i, the value of the acquired program pointer sp_code_inf[SEQ][i] is entered as the former execution sequence, and an input value is entered in the acquired program pointer sp_code_inf[SEQ][i]. Then, the value of j is initialized to zero.

(Step SI14) Whether the method at the time of changing is the automatic rearrangement method is determined. In the case of the automatic rearrangement method (YES), the process proceeds to step SI15, and if it is not the automatic rearrangement method (NO), the process is returned to step SI11.

(Step SI15) Whether j is smaller than max_i is determined. In the case where it is smaller than max_i (YES), the process proceeds to step SI16, and in the case where it is equal to or greater than max_i (NO), the process is returned to step SI11.

(Step SI16) Whether j is not equal to i is determined. If it is other than equal (YES), the process proceeds to step SI17, and if it is equal (NO), the process proceed to step SI19.

(Step SI17) Whether sp_code_inf[SEQ][j] is equal to sp_code_inf[SEQ][i] is determined. If it is equal (YES), the process proceeds to step SI18, and if it is not equal (NO), the process proceeds to step SI19.

(Step SI18) The former execution sequence is entered in sp_code_inf[SEQ][j], and the execution sequence information is updated.

(Step SI19) The value of j is updated by addition of one.

(Step SI20) The pause reservation information is changed. The count value selected by the cursor is entered in i, and an input value is entered in sp_code_inf[STP][i], and the process is returned to step SI12.

Next, sequence specification execution for machining steps, detection of end of machining steps, and execution of pause will be described with reference to the flow charts of FIGS. 16A, 16B and 16C.

(Step SJ1) An initialization process is performed. The program pointer is set to the start position by causing the current execution sequence and the previous execution sequence to be zero, now_i to be NULL, and p_pnt to be INT_PNT.

(Step SJ2) Whether the program pointer p_pnt is other than END_PNT is determined. In the case where it is other than END_PNT (YES), the process proceeds to step SJ3, and in the case where it is END_PNT, the process is ended.

(Step SJ3) Block data at the program pointer p_pnt is acquired.

(Step SJ4) Whether the acquired block is a specific code is determined. In the case of a specific code (YES), the process proceeds to step SJ8, and if otherwise (NO), the process proceeds to step SJ5.

(Step SJ5) Whether the acquired block is an end code is determined. In the case of an end code (YES), the process is ended, and if otherwise (NO), the process proceeds to step SJ6.

(Step SJ6) Execution of the acquired block is performed.

(Step SJ7) The value of the program pointer p_pnt is updated by addition of one, and the process is returned to step SJ2.

(Step SJ8) Whether the value of now_i is other than NULL is determined. In the case where it is other than NULL (YES), the process proceeds to step SJ9, and if otherwise (NO), the process proceeds to step SJ10.

(Step SJ9) Whether the value of sp_code_inf[STP][now_i] is equal to zero is determined. In the case the value is equal to zero (YES), the process proceeds to step SJ10, and if otherwise (NO), the process proceeds to step SJ21.

(Step SJ10) The value of j is made zero.

(Step SJ11) Whether j is smaller than max_i is determined. In the case where it is smaller than max_i (YES), the process proceeds to step SJ12, and in the case where it is equal to or greater than max_i (NO), the process is ended.
(Step SJ12) The value of i is made zero.
(Step SJ13) Whether the value of i is smaller than max_i is determined. In the case where it is smaller than max_i (YES), the process proceeds to step SJ14, and in the case where it is equal to or greater than max_i (NO), the process proceeds to step SJ18.
(Step SJ14) The current execution sequence is updated by addition of j+1 to the value of the previous execution sequence to obtain the current execution sequence.
(Step SJ15) Whether the current execution sequence is equal to sp_code_inf[SEQ][i] is determined. In the case where it is equal to sp_code_inf[SEQ][i] (YES), the process proceeds to step SJ16, and if otherwise (NO), the process proceeds to step SJ19.
(Step SJ16) The program pointer is updated by the value of sp_code_inf[PNT][i] being entered in the program pointer p_pnt.
(Step SJ17) The previous execution sequence is updated by sp_code_inf[SEQ][i] being entered in the previous execution sequence.
(Step SJ18) The value of j is updated by addition of one, and the process is returned to step SJ11.
(Step SJ19) The value of i is updated by addition of one, and the process is returned to step SJ13.
(Step SJ20) The value of i is entered in now_i, and the process is returned to step SJ2.
(Step SJ21) Program is paused.
(Step SJ22) Whether pause is released is determined. In the case where pause is released (YES), the process is returned to step SJ10, and in the case where pause is not released, step SJ22 is repeatedly performed until pause is released.

Additionally, in the flow charts in FIGS. 13A to 16C, operations including changing of the execution sequence of each step in the third embodiment and input of the pause reservation according to the fourth embodiment are described, but it is also possible to perform only one of the above.

What is claimed is:
1. A numerical control device configured to control a machine tool and machine a workpiece by analyzing and executing a machining program on a per block basis, comprising:
  a setting unit for setting in advance, for the machining program including a plurality of machining steps, a plurality of specific codes, each specific code indicating a corresponding limit point of a plurality of limit points of the machining steps, wherein each specific code is specified by a parameter including at least one of an arbitrary code specified by a user and a tool change command;
  an analysis/detection unit for analyzing an unexecuted block in the machining program and detecting at least one specific code of the plurality of specific codes at a preset timing before and during the execution of the machining program;
  a data acquisition/saving unit for acquiring and saving a location in a memory where a block of the at least one specific code detected by the analysis/detection unit is stored;
  a first display unit for displaying the at least one specific code, as a list, by using a plurality of locations in the memory that are acquired and saved by the data acquisition/saving unit;
  a specification unit for specifying, among the at least one specific code displayed as the list by the first display unit, a selected specific code; and
  a program restart unit for executing, by using a location in the memory of the specific code that is specified by the specification unit, a restart operation of the machining program from the machining step including the specific code that is specified after the detection by the analysis/detection unit has been completed.

2. The numerical control device including a programmed machining restart function according to claim 1, further comprising:
  a second display unit for displaying, by using the location in the memory of the specific code selected from among the at least one specific code displayed as the list by the first display unit, a block of the specific code and a predetermined number of blocks to be subsequently executed according to a program counter.

3. The numerical control device including a programmed machining restart function according to claim 1, wherein the preset time can be set either immediately before the start of or during the execution of the machining program or during the registration of the machining program.

4. The numerical control device including a programmed machining restart function according to claim 1, wherein the preset time can be set through the setting by an external input appliance.

5. The numerical control device including a programmed machining restart function according to claim 1, wherein a tool change command that is executed in each machining step is taken as a specific code indicating a corresponding limit point.

6. The numerical control device including a programmed machining restart function according to claim 1, further comprising:
  a first input setting unit that can set a change of the machining sequence of the machining steps including the at least one specific code displayed by the first display unit as the list; and
  a first input setting specification unit for specifying the machining sequence set by the first input setting unit.

7. The numerical control device including a programmed machining restart function according to claim 6, further comprising:
  a machining step sequence specification/execution unit for causing the machining program to be executed according to the machining sequence of the machining steps specified by the first input setting specification unit, by using locations in the memory that are acquired and saved by the data acquisition/saving unit.

8. The numerical control device including a programmed machining restart function according to claim 1, further comprising:
  a second input setting unit that can set a pause designation at the end of a machining step from among the machining steps including the at least one specific code that is displayed by the first display unit as the list, and a second input setting specification unit for specifying a pause designation for the machining program that is set by the second input setting unit;
  a machining step end detection unit for detecting the end of the machining step by using the location in the memory that is acquired and saved by the data acquisition/saving unit; and a pause execution unit for executing the pause of the machining program at the end of the machining step specified by the second input setting specification unit.

\* \* \* \* \*